(12) United States Patent
Haldenby et al.

(10) Patent No.: US 11,810,079 B2
(45) Date of Patent: *Nov. 7, 2023

(54) SYSTEMS AND METHODS FOR TRACKING SUBDIVIDED OWNERSHIP OF CONNECTED DEVICES USING BLOCK-CHAIN LEDGERS

(71) Applicant: The Toronto-Dominion Bank, Toronto (CA)

(72) Inventors: Perry Aaron Jones Haldenby, Toronto (CA); Rajan Mahadevan, Toronto (CA); John Jong Suk Lee, Waterloo (CA); Paul Mon-Wah Chan, Markham (CA); Orin Del Vecchio, Richmond Hill (CA)

( * ) Notice: Subject to any disclaimer, the term of this patent is extended or adjusted under 35 U.S.C. 154(b) by 470 days.

This patent is subject to a terminal disclaimer.

(21) Appl. No.: 16/516,914

(22) Filed: Jul. 19, 2019

(65) Prior Publication Data
US 2019/0340588 A1 Nov. 7, 2019

Related U.S. Application Data

(63) Continuation of application No. 14/931,414, filed on Nov. 3, 2015, now Pat. No. 10,402,793.
(Continued)

(51) Int. Cl.
*G06Q 20/06* (2012.01)
*G06F 21/64* (2013.01)
(Continued)

(52) U.S. Cl.
CPC ......... *G06Q 20/0655* (2013.01); *G06F 21/62* (2013.01); *G06F 21/645* (2013.01);
(Continued)

(58) Field of Classification Search
None
See application file for complete search history.

(56) References Cited

U.S. PATENT DOCUMENTS 5,892,900 A * 4/1999 Ginter .................... G06Q 20/12
726/26
6,363,481 B1 * 3/2002 Hardjono ................ H04L 9/085
713/165
(Continued)

FOREIGN PATENT DOCUMENTS

WO WO 2001/029777 4/2001
WO WO 2001/029777 2/2015

OTHER PUBLICATIONS

Yaga, NIST.IR.8202 (Year: 2018).*
(Continued)

*Primary Examiner* — Jacob C. Coppola
(74) *Attorney, Agent, or Firm* — Duane Morris LLP

(57) ABSTRACT

The disclosed embodiments include computerized systems and methods for generating secured block-chain-based ledger data structures that track subdivide ownership and usage of one or more assets, such as Internet-connected devices. In one instance, an apparatus associated with a rules authority of the secured block-chain-based ledger may detect an occurrence of a triggering event related to at least one of partial ownership interests in the assets, and may access and decrypt a set of rules hashed into the secured block-chain-based ledger using a confidentially-held master cryptographic key. The apparatus may identify a rule associated with the detected event, and perform one or more operations consistent with the rule, including a generation of additional data blocks reflecting a change in at least one of the partial ownership interests, and additionally or alternatively, processes that adaptively monitor a compliance of one or more partial owners with an imposed usage restriction.

20 Claims, 10 Drawing Sheets

Related U.S. Application Data

(60) Provisional application No. 62/204,768, filed on Aug. 13, 2015.

(51) Int. Cl.

| | | |
|---|---|---|
| G06Q 20/36 | (2012.01) | |
| G06Q 20/10 | (2012.01) | |
| G06Q 20/40 | (2012.01) | |
| G06F 21/62 | (2013.01) | |
| H04L 9/08 | (2006.01) | |
| H04L 9/32 | (2006.01) | |
| H04L 9/40 | (2022.01) | |
| G06Q 20/38 | (2012.01) | |
| H04N 5/913 | (2006.01) | |
| G06Q 10/0631 | (2023.01) | |
| G06Q 10/10 | (2023.01) | |
| G06Q 10/1093 | (2023.01) | |
| G06Q 50/08 | (2012.01) | |
| G06Q 10/08 | (2023.01) | |
| G06Q 30/0214 | (2023.01) | |
| G06Q 40/12 | (2023.01) | |
| G06Q 40/08 | (2012.01) | |
| G06Q 50/18 | (2012.01) | |
| H04L 9/00 | (2022.01) | |

(52) U.S. Cl.
CPC . *G06Q 10/0631* (2013.01); *G06Q 10/063114* (2013.01); *G06Q 10/08* (2013.01); *G06Q 10/103* (2013.01); *G06Q 10/1097* (2013.01); *G06Q 20/065* (2013.01); *G06Q 20/102* (2013.01); *G06Q 20/367* (2013.01); *G06Q 20/3829* (2013.01); *G06Q 20/401* (2013.01); *G06Q 20/405* (2013.01); *G06Q 20/4016* (2013.01); *G06Q 30/0214* (2013.01); *G06Q 40/08* (2013.01); *G06Q 40/128* (2013.12); *G06Q 50/08* (2013.01); *G06Q 50/18* (2013.01); *H04L 9/0816* (2013.01); *H04L 9/0861* (2013.01); *H04L 9/0891* (2013.01); *H04L 9/0894* (2013.01); *H04L 9/3247* (2013.01); *H04L 63/061* (2013.01); *H04L 63/062* (2013.01); *H04L 63/0876* (2013.01); *H04N 5/913* (2013.01); *G06Q 2220/00* (2013.01); *G06Q 2220/10* (2013.01); *G06Q 2230/00* (2013.01); *H04L 9/50* (2022.05); *H04L 63/0435* (2013.01); *H04L 63/0442* (2013.01); *H04L 63/08* (2013.01); *H04L 63/12* (2013.01); *H04L 2209/24* (2013.01); *H04L 2209/56* (2013.01); *H04N 2005/91342* (2013.01); *Y02P 90/80* (2015.11); *Y04S 10/50* (2013.01)

(56) References Cited

U.S. PATENT DOCUMENTS

| | | | |
|---|---|---|---|
| 7,656,271 B2 * | 2/2010 | Ehrman | H04L 9/40 |
| | | | 701/1 |
| 7,703,140 B2 | 8/2010 | Nath et al. | |
| 8,135,134 B2 | 3/2012 | Orsini et al. | |
| 8,223,972 B2 * | 7/2012 | Ito | H04L 9/088 |
| | | | 380/277 |
| 8,327,138 B2 | 12/2012 | Nath et al. | |
| 8,347,088 B2 | 1/2013 | Moore et al. | |
| 8,651,375 B1 | 2/2014 | Gouldd et al. | |
| 9,014,661 B2 | 4/2015 | DeCharms | |
| 9,436,923 B1 * | 9/2016 | Sriram | G06Q 10/0833 |
| 10,541,811 B2 * | 1/2020 | Peddada | H04L 9/0861 |
| 2006/0029261 A1 * | 2/2006 | Hoffman | G07C 9/37 |
| | | | 382/115 |
| 2011/0106685 A1 | 5/2011 | Silbert | |
| 2011/0106885 A1 | 5/2011 | Silbert | |
| 2014/0344015 A1 | 11/2014 | Puértolas-Montañés et al. | |
| 2015/0046337 A1 | 2/2015 | Hu et al. | |
| 2015/0081566 A1 | 3/2015 | Slepinin | |
| 2015/0128240 A1 | 5/2015 | Richards et al. | |
| 2015/0220892 A1 | 8/2015 | Allen | |
| 2016/0259937 A1 | 9/2016 | Ford et al. | |
| 2016/0306982 A1 * | 10/2016 | Seger, II | H04L 9/14 |
| 2017/0011460 A1 | 1/2017 | Molinari | |

OTHER PUBLICATIONS

Molina et al., Database Systems The Complete Book (Year: 2009).*
Herbert et al., "A novel method for decentralized peer-to-peer software license validation using cryptocurrency blockchain technology," Proceedings of the 38th Australian Computer Science Conference, Jan. 27-30, 2015, pp. 27-35.
Danezis et al., "Centrally banked cryptocurrencies," May 26, 2015 (13 pages).
Noyen et al., "When money learns to fly: towards sensing as a service applications using bitcoin," Sep. 20, 2014 (6 pages).
Lubani, "MEC in damage control over donor's lack of disbursement of funds of elections," The Oracle, Jun. 11, 2014 (3 pages).
Benchmark Consulting Services, LLC, "Construction monitoring and disbursements control," retrieved from https://www.benchmark-consulting.com/construction-monitoring-and-disbursement-control.html on Nov. 3, 2015 (1 page).

* cited by examiner

SYSTEMS AND METHODS FOR TRACKING SUBDIVIDED OWNERSHIP OF CONNECTED DEVICES USING BLOCK-CHAIN LEDGERS

CROSS-REFERENCE TO RELATED APPLICATIONS

This application is a continuation of, and claims the benefit of priority to, U.S. application Ser. No. 14/931,414, filed Nov. 3, 2015, which claims the benefit of U.S. Provisional Patent Application No. 62/204,768, filed Aug. 13, 2015. The disclosures of these applications are expressly incorporated by reference herein to their entireties.

DESCRIPTION

Technical Field

The disclosed embodiments generally relate to computerized systems and methods for securing data, and more particularly, and without limitation, computerized systems and methods that generate secured block-chain-based ledger structures.

Background

Modern commercial enterprises, such as financial institutions, multinational corporations, and law firms, often link together multiple, fragmented, and geographically dispersed business units and lines-of-business. Although operating within a common enterprise, the fragmented nature of these distinct business units and lines-of-business renders complex any attempt to accurately identify and capture the various points of customer interaction across the enterprise. Further, devices operating within these fragmented and geographically dispersed business units and lines-of-business often execute various and often mutually-incompatible software applications (with corresponding mutually-incompatible data inputs and outputs), which often prevents the timely aggregation of data captured across the enterprise devices and the dissemination of the aggregated data within the enterprise. The lack of business-unit and line-of-business integration may lead to an environment characterized by incoherent customer management, which may prevent conventional block-ledger architectures from tracking and quantifying occurrences of enterprise-specific events, such as cross-line-of-business referrals and cross-line-of-business interactions.

SUMMARY

The disclosed embodiments relate to computerized systems and methods that generate secured block-chain-based ledger structures tracking a time evolution of ownership interests, rights, and obligations in one or more assets operating fragmented and geographically dispersed enterprises.

In one embodiment, and apparatus includes at least one processor and a memory storing executable instructions that, when executed by the at least one processor, causes the at least one processor to perform the step of accessing data corresponding to at least one block-chain ledger. In one aspect, the accessed block-chain ledger data may track a temporal evolution of ownership interests held by one or more parties in at least one asset. The executable instructions may further cause the at least one processor to perform the steps of detecting an occurrence of an first event impacting a first ownership interest held by a first one of the parties, and decrypting (i) a first encrypted portion of the block-chain ledger data using a first cryptographic key and (ii) a second encrypted portion of the block-chain ledger data using a second cryptographic key. In some aspects, the decrypted first data portion may identify a plurality of triggering events, and the decrypted second data portion may identify a plurality of rules associated with a rules authority. The executable instructions may further cause the at least one processor to perform the steps of determining, based on the decrypted first data portion, that the detected first event corresponds to at least one of the triggering events, and in response to the determination, identifying, based on the detected second data portion, at least one of the rules that exhibits a causal relationship with the detected first event. The executable instructions may further cause the at least one processor to perform the step of generating an electronic command to perform one or more operations consistent with the at least one identified rule.

In additional embodiments, computer-implemented method includes accessing, using at least one processor, data corresponding to at least one block-chain ledger. In one aspects, the accessed block-chain ledger data may track a temporal evolution of ownership interests held by one or more parties in at least one asset. The method may also include detecting, using at least one processor, an occurrence of an first event impacting a first ownership interest held by a first one of the parties, and using at least one processor, decrypting (i) a first encrypted portion of the block-chain ledger data using a first cryptographic key and (ii) a second encrypted portion of the block-chain ledger data using a second cryptographic key. In some aspects, the decrypted first data portion identifying a plurality of triggering events, and the decrypted second data portion may identify a plurality of rules associated with a rules authority. The method may also include determining, using at least one processor, and based on the decrypted first data portion, that the detected first event corresponds to at least one of the triggering events, and in response to the determination, identifying, using at least one processor, and based on the detected second data portion, at least one of the rules that exhibits a causal relationship with the detected first event. The method also generates, using at least one processor, an electronic command to perform one or more operations consistent with the at least one identified rule.

In another embodiment, an apparatus may include at least one processor and a memory storing executable instructions that, when executed by the at least one processor, causes the at least one processor to perform the step of accessing data corresponding to at least one block-chain ledger. In one aspect, the accessed block-chain ledger data may track a temporal evolution of ownership interests held by one or more parties a connected device. The executed instructions may further cause the at least one processor to perform the step of decrypting (i) a first encrypted portion of the block-chain ledger data using a first cryptographic key and (ii) a second encrypted portion of the block-chain ledger data using a second cryptographic key. In some aspects, the decrypted first data portion may identify a plurality of triggering events, and the decrypted second data portion may identify a plurality of rules associated with a rules authority. The executed instructions may further cause the at least one processor to perform the steps of obtaining a third portion of the block-chain ledger data that includes usage data indicative of at least one of a location, a performance, an operation, or a status of the connected device during a corresponding time period, and identifying, based on the detected second data portion, at least one of the rules that specifies a usage restriction on the connected device and at least one penalty associated with a violation of the restriction. The executed instructions may further cause the at least one processor to perform the steps of determining, based on at least a portion of the usage data, that at least one of the parties violated the usage restriction, and generating an electronic command to impose the at least one specified penalty on the at least one party in accordance with the at least one rule.

It is to be understood that both the foregoing general description and the following detailed description are exemplary and explanatory only, and are not restrictive of the disclosed embodiments as claimed. Further, the accompanying drawings, which are incorporated in and constitute a part of this specification, illustrate aspects of the present disclosure and together with the description, serve to explain principles of the disclosed embodiments as set forth in the accompanying claims

DETAILED DESCRIPTION

Figure 1:
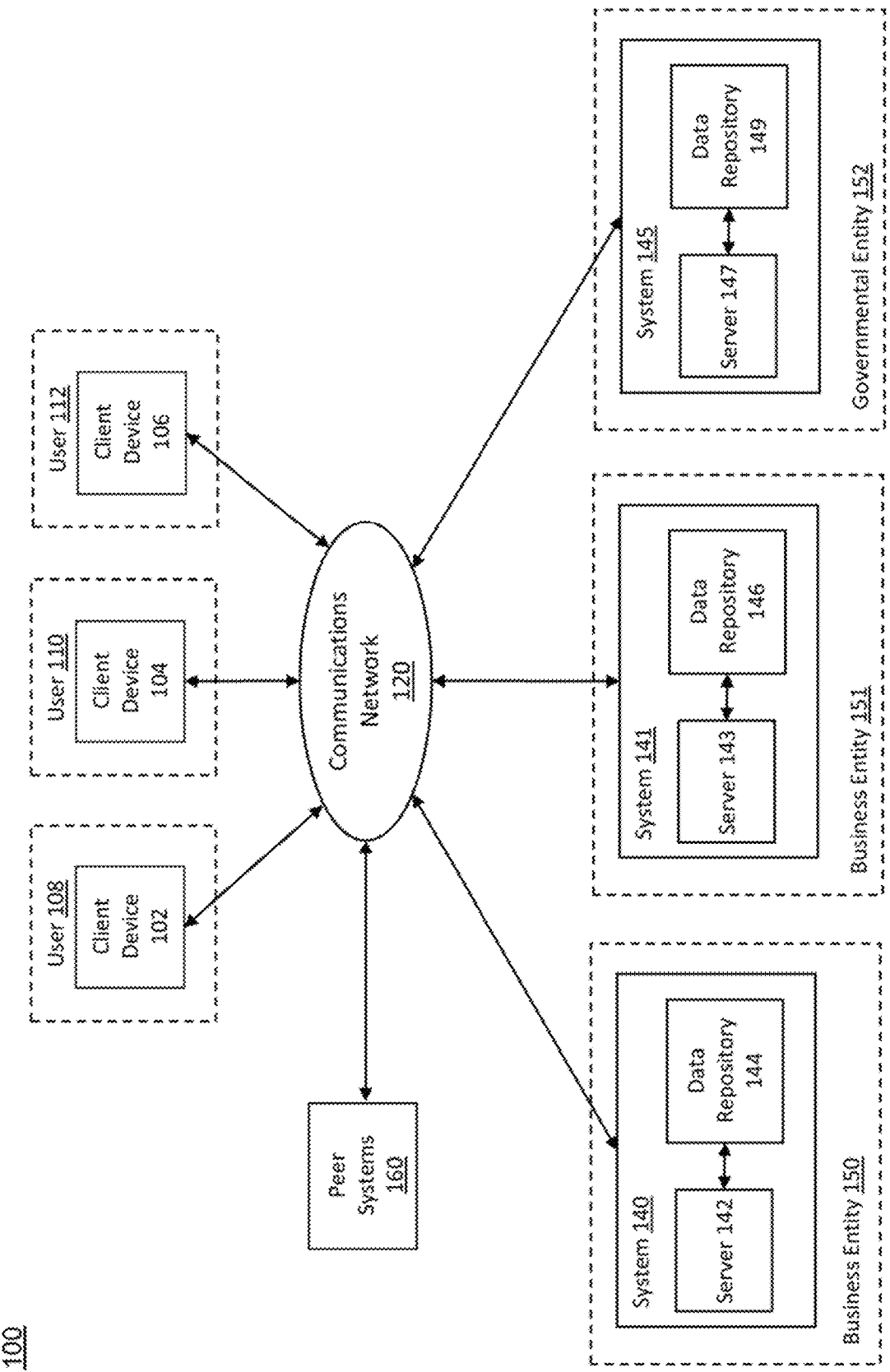
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

I. Exemplary Computing Environments Networks, Systems, and Devices

FIG. 1 illustrates an exemplary computing environment 100 consistent with certain disclosed embodiments. In one aspect, computing environment 100 may include client devices 102, 104, and 106, system 140, peer systems 160, and a communications network 120 connecting one or more of the components of environment 100.

Consistent with the disclosed embodiments, one or more of the components of computing environment 100 may be configured to address problems inherent to conventional block-chain-based ledgers by embedding a private-master encryption key architecture into a conventional block-chain architecture (e.g., a block-chain-based architecture associated with the public Bitcoin™ ledger). In some aspects, the resulting hybrid block-chain architecture may facilitate a selective encryption of information by client devices 102, 104, and 106, system 140, and/or peer systems 160, thus providing a technical solution that protects sensitive and/or confidential instructions sets and event triggers and corresponding confidential instructions sets.

a. Exemplary Client Devices

In one embodiment, client devices 102, 104, and/or 106 may include a computing device, such as, but not limited to, a hashing computer, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device(s), consistent with disclosed embodiments. In certain embodiments, at least one of client devices 102, 104, and/or 106 may be associated with one or more users, such as users 108, 110, and/or 112. For instance, user 110 may operate client device 104 and may do so to cause client device 104 to perform one or more operations consistent with the disclosed embodiments.

Client devices 102, 104, and/or 106 may include one or more tangible, non-transitory memories that store data and/or software instructions, and one or more processors configured to execute software instructions. Client devices 102, 104, and/or 106 may include one or more display devices that display information to a user and one or more input device(s) to allow the user to input information to client device 102, 104, and/or 106 (e.g., keypad, keyboard, touchscreen, voice activated control technologies, or any other type of known input device).

In one aspect, client devices 102, 104, and/or 106 may store in memory one or more software applications that run on client device 104 and are executed by the one or more processors. In some instances, client device 104 may store software applications that, when executed by one or more processors, perform operations that establish communications with one or more of peer systems 160 (e.g., across network 120) and that obtain, from peer systems 160, a current version of a hybrid block-chain ledger generated and maintained in accordance with the disclosed embodiments.

In other instances, and as described below, one or more of client devices 102, 104, and/or 106 may execute the one or more stored software application and to obtain data from the hybrid block-chain ledger that includes, but not limited to, data identifying one or more tracked assets, and/or a public key of one or more users. Further, and as described below, the one or more executed software applications may cause client devices 102, 104, and/or 106 to extract, from the one or more accessed blocks, a copy of an encrypted and/or hashed ownership/rules portion of the transaction block (e.g., including the identification a holder of a master key) and/or a copy of an encrypted and/or hashed master data block (e.g., encrypted using the master key and including rules permitting preconfigured and/or actions involving the tracked assets), In additional instances, and as further described below, client devices 102, 104, and/or 106 may provide information associated with one or more actions or transactions involving the tracked assets (e.g., information identifying the actions or transaction, information identifying the assets, a public key, a digital signature, etc.) to peer systems 160, along with copies of the encrypted and/or hashed rules engines and lists of triggering events.

In some aspects, the one or more stored applications may include a wallet application provided by business entity 150 (e.g., a mobile wallet application or an application executable on a desktop computer) and capable of initiating transactions denominated in one or more currencies, including virtual currencies such as Bitcoin™.

b. Exemplary Computer Systems

Systems 140, 141, and 145 may be computing systems configured to execute software instructions to perform one or more operations consistent with disclosed embodiments. In one aspect, systems 140 and 141 may be associated with business entities 150 and 151 (e.g., a financial institution) that provide financial accounts, financial services transactions, and investment services one or more users (e.g., customers of the business entities 150 and 151). In further aspects, system 145 may be associated with a governmental or regulatory entity 152 that, among other things, provides title and deed processing and recordation services to users (e.g., customers of governmental entity 152). In some aspects, systems 140, 141, and/or 145 may be distributed systems that may include computing components distributed across one or more networks, such as network 120, or other networks.

In one aspect, systems 140, 141, and 145 may include computing components configured to store, maintain, and generate data and software instructions. For example, system 140 may include one or more servers (e.g., server 142) and tangible, non-transitory memory devices (e.g., data repository 144). Similarly, system 141 may include one or more servers (e.g., server 143) and tangible, non-transitory memory devices (e.g., data repository 146), and system 145 may include one or more servers (e.g., server 147) and tangible, non-transitory memory devices (e.g., data repository 149).

Server 142 (and additionally or alternatively, servers 143 and 147) may include one or more computing devices that may be configured to execute software instructions to perform one or more processes consistent with the disclosed embodiments. In one example, server 142 may be a computing device that executes software instructions that perform operations that provides information to one or more other components of computing environment 100.

In one embodiment, server 142 (and additionally or alternatively, servers 143 and 147) may include a computer (e.g., a personal computer, network computer, or mainframe computer) having one or more processors that may be selectively activated or reconfigured by a computer program. In one aspect, server 142 (or other computing components of system 140) may be configured to provide one or more websites, digital portals, etc., that provide services consistent with business entity 150, such as a digital banking or investment portal, and services consistent with disclosed embodiments. For instance, server 142 may be configured to provide information associated with a requested web page over communications network 120 to client device 104, which may render the received information and present content from the web page on a display device, e.g., a touchscreen display unit.

In other aspects, servers 142, 143, and/or 147 (or other computing components of systems 140, 141, and/or 145) may be configured to provide information to one or more application programs executed by client device 104 (e.g., through a corresponding application programming interface (API)). For example, client device 104 may execute an application program associated with and provided by business entity 150, such a mobile banking application and/or a mobile wallet application, to provide services consistent with the disclosed embodiments. In some instances, server 142 may provide information to client devices 102, 104, and/or 106 (e.g., through the API associated with the executed application program), and client devices 102, 104, and/or 106 may be configured by the executed application program to present portions of the information to corresponding users through a corresponding graphical user interface (GUI).

In further aspects, servers 142, 143, and/or 147 (or other computing components of systems 140, 141, and/or 145) may be configured to provide to client devices 102, 104, and/or 106 (and/or receive from client device 104) information associated with services provided by business entities 150 and 151 and governmental entity 152. For example, client device 104 may receive the transmitted information, and store portions of the information in locally accessible storage device and/or network-accessible storage devices and data repositories (e.g., cloud-based storage). In one instance, client device 104 may execute stored instructions (e.g., an application program, a web browser, a mobile banking application, and/or a mobile wallet application) to process portions of the stored data and render portions of the stored data for presentation to user 110. Additionally, servers 142, 143, and/or 147 may be incorporated as a corresponding node in a distributed network, and additionally or alternatively, as a corresponding networked server in a cloud-computing environment. Furthermore, servers 142, 143, and/or 147 may communicate via network 120 with one or more additional servers (not shown), which may facilitate the distribution of processes for parallel execution by the additional servers.

In further aspects, business entity 150 may represent a "rules entity" capable of regulating transactions involving assets (e.g., units of virtual currency, units of various financial instruments, physical assets, connected devices, real estate, etc.) tracked within hybrid public-private ledgers consistent with the disclosed embodiments. Further, business entity 150, acting as the rules authority, may be capable of regulating transfers of ownership of these assets, either singly or jointly through subdivided interests, tracked within hybrid public-private ledgers consistent with the disclosed embodiments. By way of example, one or more computing components of system 140 (e.g., server 142) may be configured (e.g., by executed software instructions) to establish one or more rules that regulate a distributions of and/or transactions associated with the tracked assets, an initiation of transfers of the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets tracked in the hybrid public-private ledger, etc.).

Additionally, in some aspects, system 140 may establish causal relationships between one or more of the established rules and one or more events that trigger an initiation of one or more corresponding regulated distributions, transfers, and/or other actions involving assets tracked within the hybrid public-private ledger (e.g., "triggering events"). For example, a confirmed loss of a private cryptographic key issued to user 110 may represent a triggering event that causes system 140 to verify user 110's identity, initiate a transaction of the orphaned assets, generate a new pair of public and private cryptographic keys for user 110 (i.e., public and private block-chain keys), and transmit at least the private block-chain key to user 110 through secure, non-accessible processes, in accordance with one or more of the established rules.

Further, by way of example, a theft of a portion of user 110's tracked assets (e.g., units of virtual currency specified within one of more blocks of the hybrid public-private ledger) may represent a triggering event that causes system 140 to initiate a recovery protocol to generate a transaction request to recover the value of the stolen assets (e.g., to transfer the stolen assets back to user 110), and further, to generate a new pair of public and private block-chain keys for user 110, as described above. In other instances, a death and/or incapacitation of user 110 may represent a triggering event that causes system 140 to initiate a series of transaction to distribute of at least a portion of the tracked assets (e.g., through corresponding transaction requests consistent with the disclosed embodiments) to one or more additional owners identified by user 110 and specified within corresponding ones of the identified rules.

In some aspects, system 140 may be configured to establish one or more of the rules, and further, one or more of the causal relationships and triggering events, based on internal regulations associated with business entity 150. For example, the one or more internal regulations associated with business entity 150 may specify that system 140 verify an identity of user 110 (e.g., based on various forms of multi-factor authentication data) and/or obtain specific elements of documentation (e.g., a police report, etc.) prior to initiating the lost private key protocol and/or the recovery protocols outlined above. In other aspects, system 140 may one or more of the rules and/or triggering events based on information received from user 110 (e.g., as input provided to a web page or other graphical user interface (GUI) presented by client device 104 and provided to system 140). For example, user 110 may specify, as input to the web page or GUI presented by client device 104, one or more individuals that would receive portions of the tracked assets upon completion of one or more tasks and/or in the event of user 110's accidental death. The disclosed embodiments are, however, not limited to the exemplary triggering events and established rules described above, and in further aspects, the disclosed embodiments may be configured to generate any additional or alternate user- and system-specified rules and triggering events consistent with the hybrid public-private ledger and appropriate to the tracked assets, user 110, and/or business entity 150 (i.e., acting as a rules authority for the hybrid public-private ledger).

Further, and as outlined below, system 140 may be configured to store the one or more established rules (e.g., as a rules engine) and one or more of the established trigger events (e.g., as an event trigger list) within a portion of a local data repository (e.g., data repository 144). Additionally or alternatively, system 140 may be configured to store portions of the rules engine and/or event trigger list within a secure data repository accessible to system 140 across network 140 (e.g., cloud-based storage).

As described above, one or more computing components of system 140 (e.g., server 142) may be configured to generate pairs of public and private block-chain keys for user 110 (e.g., user 110's public/private block-chain key pair), and to provide the generated private block-chain key to user 110 through secure, non-accessible and/or out-of-band communications (e.g., by mail, etc.). In further embodiments, the one or more components of system 140 (e.g., server 142) may be configured to generate and maintain additional cryptographic keys that facilitate a generation and maintenance of portions of the hybrid public-private ledger. For instance, system 140 may be configured to generate a master key, which system 140 may leverage to encrypt the stored rules engine. In certain aspects, system 140 may store copies of the generated master key in a portion of data repository 144 that is not accessible to user 110 (and any other users), thus maintaining a confidence of the generated master key.

In additional aspects, system 140 may be configured to generate and maintain a private crypto key on behalf of user 110 (and additionally or alternatively, user 108 and 112), which system 140 may leverage to encrypt the stored event trigger list, and which may be provided to user 110 (and/or to user 108 and 112) through secure, non-accessible and/or out-of-band communications, Further, and as described above, system 140 may store copies of the private crypto keys in a portion of data repository 144.

Further, in additional embodiments, one or more computing components of system 140 (e.g., server 140) may be configured to hash the generated (and encrypted) rules engine and event trigger list into a genesis block associated with the hybrid public-private ledger. In other aspects, system 140 may provide the encrypted rules engine and event triggers list to one or more of peer system 160, which may be configured to hash the encrypted rules engine and event trigger list into the genesis block. By way of example, and by hashing the encrypted rules engine and event trigger list into the genesis block of the hybrid public-private ledger, the disclosed embodiments enable an in-band communication of the encrypted rules engine and event triggers from user to user within blocks (e.g., transactions) of the hybrid public-private ledger In additional embodiments, one or more computing components of system 141 (e.g., server 143) and/or system 145 (e.g., server 147) may perform one or more of the exemplary operations described above in reference to system 140, which facilitate business entity 151's and/or governmental entity 152's functionality as a "rules authority" within computing environment 100.

c. Exemplary Data Repositories and Stored Data

Data repositories 144, 146, and/or 149 may include one or more memories that are configured to store and provide access to data and/or software instructions. Such memories may include tangible non-transitory computer-readable media that store software instructions that, when executed by one or more processors (e.g., of servers 142, 143, and/or 147), perform one or more operations consistent with disclosed embodiments. Data repositories 144, 146, and/or 149 may also be configured to store information relating to business entities 150 and 151, e.g., financial institutions, and/or governmental entity 152.

For instance, data repositories 144, 146, and/or 149 may store customer data that uniquely identifies customers of a financial institution associated with systems 140, 141, and/or 145. By way of example, a customer of the financial institution (e.g., users 108, 110, and/or 112) may access a web page associated with system 140 (e.g., through a web server executed by a corresponding front end), and may register for digital banking services and provide data, which may be linked to corresponding ones of users 108, 110, and/or 112, and stored as customer data within data repository 144. The stored customer data may, for example, include personal information, government-issued identifiers, employment information, and contact information. The stored customer data may also include authentication credentials associated with registered users of the financial institution (e.g., a user name, a user-specified password, a system-generated password, an alphanumeric identification number (e.g., a PIN number) specified by the users or assigned by system 140, biometric information, and information facilitating enhanced authentication techniques).

In additional aspects, and as described above, data repositories 144, 146, and/or 149 may store a rules engine identifying or more rules that regulate a distribution of the tracked assets, an initiation of one or more transactions involving the tracked assets (e.g., a sale, a transfer in ownership, a use of the tracked assets as collateral in a secured transaction etc.), and further, any additional or alternate action involving the tracked assets and/or the hybrid public-private ledger (e.g., processes that generate additional cryptographic key sets for users 108, 110, and/or 112, processes that recover assets racked in the hybrid public-private ledger, etc.). Further, and as described above, data repositories 144, 146, and/or 149 may also store information identifying an event triggers list that identifies causal relationships established by systems 140, 141, and/or 142 between one or more of the established rules and one or more events that trigger an initiation of one or more corresponding regulated distributions, transactions, and/or assets tracked within the hybrid block-chain ledger (e.g., "triggering events").

In some aspects, systems 140, 141, and/or 142 may be configured to establish one or more of the rules, and further, one or more of the causal relationships and triggering events, based on one or more internal regulations associated with corresponding ones of business entities 150 and 151 and governmental entity 152. In other aspects, systems 140, 141, and/or 142 may be configured to establish one or more of the rules and/or triggering events based on information received from one or more of users 108, 110, and/or 112 (e.g., as input provided to a web page or other graphical user interface (GUI) presented by client devices 102, 104, and/or 106 and provided to systems 140, 141, and/or 142).

In an embodiment, data repositories 144, 146, and/or 149 may also store a copy of a master key and private crypto keys associated with users 108, 110, and 112 (and additionally or alternatively, additional private crypto keys associated with other users). By way of example, system 140 may be configured to store the private crypto keys in a data structure that includes information that associates the private crypto keys with corresponding ones of user 108, 110, and 112, and further, may be configured to store the master key in a data structure within data repository 144 that is inaccessible to users 108, 110, and/or 112 (and additionally or alternatively, to other users). Further, in some aspects, data repository 144 may be configured to store the rules engine and/or event triggers list in raw, unencrypted form. In other aspects, consistent with the disclosed embodiments, data repository 144 may be configured to store the rules engine and/or event triggers in encrypted form (e.g., using the stored master key), and/or store a hashed representation of the rules engine and/or the event triggers list. Systems 141 and 145 may be configured to store the private crypto keys, master key, rules engine, and/or event triggers within corresponding ones of data repositories 146 and 149 in a manner similar to that described above.

d. Exemplary Communications Networks

Communications network 120 may include one or more communication networks or medium of digital data communication. Examples of communication network 120 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. Consistent with embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

e. Exemplary Peer Systems

Referring back to FIG. 1, peer systems 160 may include one or more computing systems configured to execute software instructions to perform one or more operations consistent with disclosed embodiments. In some aspects, peer systems 160 may include computing components configured to store, maintain, and generate data and software instructions. For example, each of peer systems 160 may include one or more computing devices (e.g., a server, network computer, or mainframe computer) having one or more processors that may be selectively activated or reconfigured by executable instructions (e.g., computer programs) stored in one or more tangible, non-transitory computer-readable storage devices.

In an embodiment, one or more of peer system 160 may be configured to receive, from client device 104 across network 120, information associated with a distribution of, transaction involving, or other action associated with one or more assets tracked within hybrid block-chain ledgers consistent with the disclosed embodiments. By way of example, the received information may include, but is not limited to, data identifying at least a portion of the tracked assets, data identifying a current owner of the portion of the tracked assets (e.g., user 110) (or a obfuscated owner identifier), and further, encrypted copies of and/or hash values representative of the rules engine and event triggers list.

In some aspects, the one or more of peer systems 160 may be configured (e.g., by the executed software programs) to validate the received information and to generate a new block of the hybrid block-chain ledger that includes the received information, either alone (e.g., using a "one transaction, one block" paradigm) or in combination with information identifying additional distributions, transactions, or other actions associated with one or more tracked assets (e.g., as a multiple-transaction block). The one or more of peer systems 160 may be further configured to generate one or more hashes representative of the new block, which may be appended to a prior version of the hybrid private-public ledger along with the newly generated block. In some aspects, the one or more of peer system 160 may maintain the updated versions of the hybrid private-public ledger (i.e., the latest, longest hybrid private-public ledger), and may provide the updated version of the hybrid private-public ledger to client devices 102, 104, and/or 106 (and additionally or alternatively, other client devices associated with other users) upon receipt of a request across network 120 and/or at regular or predetermined intervals.

In certain instances, and in addition to a connection with network 120, peer systems 160 may be interconnected across a peer-to-peer network (not depicted in FIG. 1) using any of the wired or wireless communications protocols outlined above. Further, in some instances, one or more of peer systems 160 may function as a "miner," where any miner may be compensated in units of a virtual currency (e.g., Bitcoin™) for validating the received data and for generating updated versions of the hybrid block-chain ledger.

II. Exemplary Processes for Tracking Assets Using Hybrid Block-Chain Ledgers In some embodiments, client devices 102, 104, and/or 106 may execute one or more stored applications that enable corresponding users to track, in conjunction with peer systems 150 and other components of computing environment 100, a disposition and distribution of one or more assets using conventional, publicly available and transparent block-chain ledgers. In some aspects, the use of public block-chain ledgers to track ownership, disposition, and distribution of actual and/or virtual assets (e.g., unit of virtual currencies, such as Bitcoin™, unit of other financial instruments and securities, physical assets, etc.) may present advantages over existing rules server systems, such as those provided by financial institutions that leverage private ledgers.

a. Asset Tracking Using Conventional Block-Chain Ledgers

Figure 2:
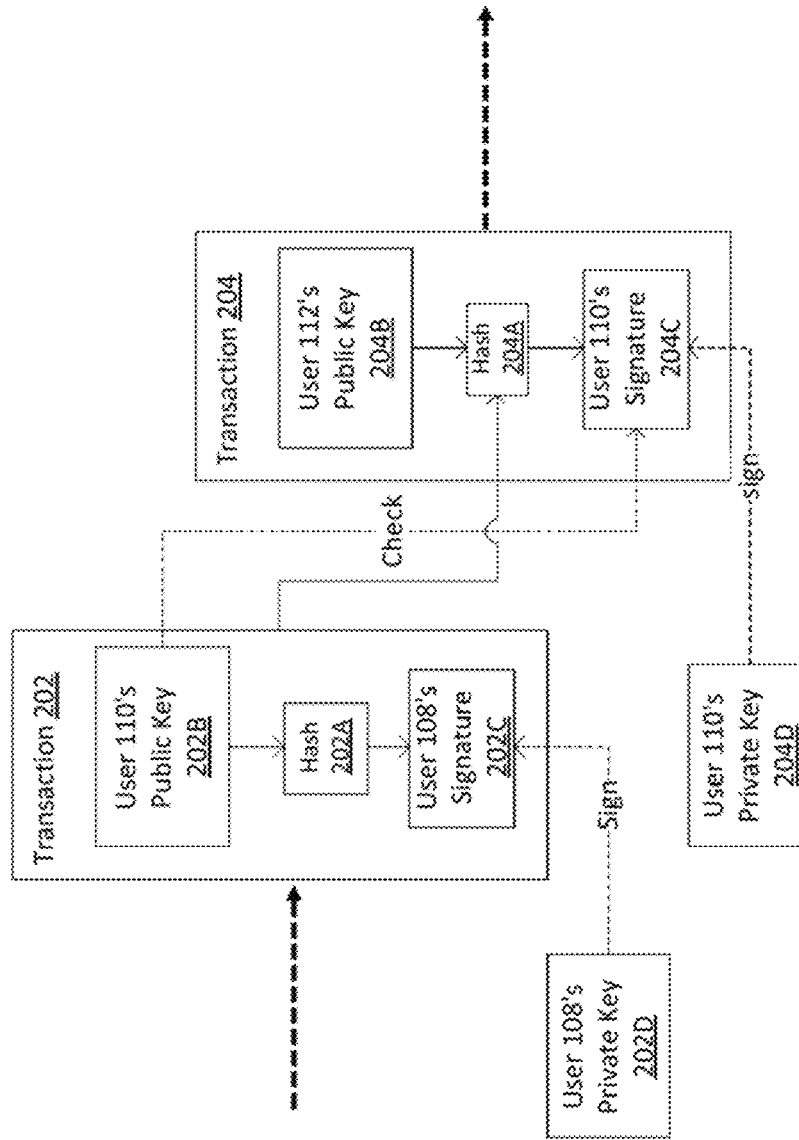
FIG. 2 is a schematic diagram illustrating a conventional block-chain ledger architecture.

FIG. 2 is a schematic diagram of an exemplary structure 200 of a conventional block-chain ledger, which may be generated through the interaction of components of computing environment 100. For example, as described in reference to FIG. 2, a user (e.g., user 110) may be associated with a device (e.g., client device 104) that executes a stored software application (e.g., a wallet application) capable of obtaining a current version of a conventional block-chain ledger from one or more networked computer systems (e.g., one of peer systems 160 configured to "mine" broadcasted transaction data and update ledgers). In some aspects, the current version of a conventional block-chain ledger may represent a "longest" block-chain ledger than includes a maximum number of discrete "blocks," which may identify transactions that transfer, distribute, etc., portions of tracked assets among various owners, including user 110.

For example, client device 104 may obtain the current block-chain ledger, and may process the block chain ledger to determine that a prior owner (e.g., user 108) transferred ownership of a portion of the tracked assets to user 110 in a corresponding transaction (e.g., transaction 202, schematically illustrated in FIG. 2). As described above, one or more of peer systems 160 may have previously data verified, processed, and packed associated with transaction 202 may be into a corresponding block of the conventional block-chain using any of the exemplary techniques described above and/or apparent to one of ordinary skill in the art.

In some aspects, as illustrated in FIG. 2, transaction 202 may include input data that references one or more prior transactions (e.g., transactions that transferred ownership of the tracked asset portion to user 108), and further, output data that includes instructions for transferring the tracked asset portion to one or more additional owners (e.g., user 110). For example, input data consistent with the disclosed embodiments may include, but is not limited to, a cryptographic hash of the one or more prior transactions (e.g., hash 202A) and the set of rules and triggers associated with the assets while the output data consistent with the disclosed embodiments may include, but is not limited to, a quantity or number of units of the tracked asset portion that are subject to transfer in transaction 202 and a public key of the recipient (e.g., public key 202B of user 110).

Further, in some aspects, the transaction data may include a digital signature 202C of user 108 (e.g., the prior owner), which may be applied to hash 202A and public key 2028 using a private key 202D of user 108 through any of a number of techniques apparent to one of skill in the art and appropriate to the conventional block-chain ledger architecture. By way of example, the presence of user 108's public key within transaction data included within the conventional block-chain ledger may enable client device 104 and/or peer systems 160 to verify user 108's digital signature, as applied to data associated with transaction 202.

In an embodiment, user 110 may elect to further transfer the tracked asset portion to an additional user (e.g., user 112). For example, as described above, client device 104 may execute one or more software applications (e.g., wallet applications) that generate input and output data specifying a transaction (e.g., transaction 204 of FIG. 2) that transfers ownership of the tracked asset portion from user 110 to user 112, and further, that transmit the generated data to one or more of peer systems 160 for verification, processing (e.g., additional cryptographic hashing) and inclusion into a new block of the clock-chain ledger.

For example, data specifying transaction 204 may include, but is not limited to, a cryptographic hash 204A of prior transaction 202, a quantity or number of units of the tracked asset portion that are subject to transfer in transaction 204, and a public key of the recipient (e.g., public key 204B of user 112). Further, in some aspects, the data specifying transaction 204 may include a digital signature 204C of the user 110, which may be applied to hash 204A and public key 204B using a private key 204D of user 110 using any of the exemplary techniques described above. Further, and by way of example, the presence of user 110's public key 202B within transaction data included within the conventional block-chain ledger may enable various devices and systems (e.g., client devices 106, 106, and/or 108, peer systems 160, etc.) to verify user 110's digital signature 204C, as applied to data specifying transaction 204.

As described above, one or more of peer systems 160 may receive the data specifying transaction 204 from client device 104. In certain instances, peer systems 160 may act as "miners" for the block-chain ledger, and may competitively process the received transaction data (either alone or in conjunction with other data) to generate additional blocks of the ledger, which may be appended to the block-chain ledger and distributed across peer systems 160 (e.g., through a peer-to-peer network) and to other connected devices of environment 100.

In some aspects, conventional block-chain ledger architectures described above may enable the public to review content of the ledgers and verify ownerships. Further, the decentralized nature of conventional block-chain ledgers may also enable multiple distributed networks to verify the contents of a single ledger. The resulting redundancy may render conventional block-chain ledger architecture more robust than centralized server systems, and effectively eliminate the falsification of ledger data by malicious parties.

Despite these advantages, conventional block-chain ledger architectures may exhibit significant flaws when implemented by secured, high-risk systems. By way of example, unencrypted conventional ledger blocks may represent a security concern for transactions of sensitive nature, and further, may represent a privacy concern for members of the general public. For instance, information indicative of an interaction of a prior asset owner and a corresponding device, as present within conventional block-chain ledgers, may represent private information that should not be available to future owners, let alone members of the public.

Further, if an owner were to lose or misplace a corresponding private key, the distributed nature of conventional block-chain ledger architectures, such as those described above, provide little recourse to recover possession of the one or more tracked assets. In certain aspects, the rigidity and inflexibility of these conventional block-chain ledger architectures, and their inability to adapt to changing circumstances (e.g., loss of private keys, theft of tracked assets due to fraudulent or malicious activity), often results in volatility in the usage of the tracked assets and an erosion in a public trust of conventional block-chain ledgers.

Thus, there is a need for improved systems and methods that not only enhance the security of block-chain ledger architectures for use high-risk, sensitive applications, but that also provide a framework that provides owners or holders of assets tracked by block-chain ledger architectures with recourse in an event of fraud or malicious activity, while maintaining the public availability and verification characteristic of block-chain ledgers.

b. Exemplary Hybrid Public-Private Block-Chain Ledger Architectures

The disclosed embodiments address these and other problems associated with conventional block-ledger architectures in a technical manner, by providing computer-implemented systems and methods that augment a conventional block-chain ledger with a private-master encryption key architecture that, in conjunction with an owner's pair of public and private block-chain keys, selectively encrypt ledger data to protect both a privacy of owners of tracked assets and a confidentiality of existing instruction sets maintained within the block-chain ledger.

Further, by incorporating an encrypted rules engine and corresponding list of triggering events (e.g., an event triggers list) into each block of the conventional block-chain ledger architecture (and thus generating a hybrid, public-private block-chain architecture), computer-implemented systems and methods consistent with the disclosed embodiments may perform operations that provide owners or holders tracked assets with recovery options in an event of fraud or malicious activity, while maintaining the public availability and verification characteristic of conventional block-chain ledgers.

In certain aspects, discrete data blocks of the conventional block-chain ledgers (e.g., as outlined above in reference to FIG. 2) and of the hybrid block-chain ledgers (e.g., as described in reference to FIG. 3) may include common elements of data that may specify transactions that distribute, transfer, and/or otherwise act upon portions of tracked assets. For example, these common data elements may include, but are not limited to, input data that references one or more prior transactions (e.g., a cryptographic hash of the one or more prior transactions), output data that includes instructions for transferring the tracked asset portion to one or more additional owners (e.g., a quantity or number of units of the tracked asset portion that are subject to the transaction and a public key of the recipient) and further, a digital signature applied to the input and/or output data using a corresponding public key of a current owner of the tracked asset portion. The disclosed embodiments are, however, not limited to exemplary transactions that include a transfer of tracked assets and to the exemplary data elements described above, and in further embodiments, discrete blocks of the hybrid block-chain legers may represent any additional or alternate transaction appropriate to the tracked assets, and further, any additional or alternate data appropriate to the tracked assets and to the transaction.

In contrast to the conventional block-chain ledgers described above, the disclosed embodiments may establish a "rules authority" capable of vetting real-time transactions (e.g., distributions, transfers, and/or other actions) involving portions of assets tracked within the exemplary hybrid block-chain ledger architectures described herein, and further, of establishing and maintaining rules (e.g., through a rules engine and corresponding list of triggering events) that facilitate regulatory-based, policy-based, and customer-specified controls of transactions involving the tracked assets (e.g., units of virtual currency, etc.).

For example, and as described above, business entity 150 may represent the rules authority, and one or more computing components of system 150 may perform operations that establish the rules engine and the list of triggering events, which may be stored within a secure data repository (e.g., data repository 144). In some aspects, the generated and stored rules engine may identify or more rules that regulate a distribution of the tracked assets, an initiation of one or more transactions involving the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets racked in the hybrid public-private ledger, etc.). Further, and as described above, the generated and stored list of triggering events may include information that specifies causal relationships between one or more of the established rules and one or more events that trigger an initiation of one or more corresponding regulated distributions, transactions, and/or actions associated with assets tracked within the hybrid public-private ledger (e.g., the triggering events).

In some aspects, system 140 may establish one or more of the rules and/or triggering events to reflect regulations and/or policies promulgated by governmental entity, a financial regulator, and/or the rules authority. For example, system 140 may establish a loss of a private key by user 110 as a "triggering event" that would cause system 140 to perform operations that create a new transaction and generate a new pair of public and private block-chain keys for user 110 in response to a verification of particular authentication credentials. In other aspects, system 140 may establish one or more of the rules and/or triggering events based on information received from user 110 (e.g., as input provided to a web page or other graphical user interface (GUI) presented by client device 104 and provided to system 140). For example, user 110 may specify a particular distribution of tracked assets (e.g., recurring bill payments, distributions to other owners, etc.) in response to an accident involving user 110 and/or user 110's death (e.g., triggering events).

In further contrast to the conventional block-chain ledgers described above, one or more computing components of system 140 (e.g., server 142 upon execution of stored instructions) may generate additional cryptographic keys that facilitate the exemplary regulation of transactions (e.g., distributions, transfers, and/or actions) involving assets tracked within the hybrid public-private ledger. By way of example, system 140 may generate a master cryptographic key with which system 140 may encrypt the generated and stored rules engine. In some aspects, certain aspects, system 140 may store copies of the generated master key in a portion of data repository 144 that is not accessible to user 110 (and any other users), thus maintaining a confidence of the generated master key.

System 140 may also perform operations that encrypt the generated list of triggering events, either alone or in conjunction with metadata identifying the rules authority and/or information facilitating a processing of the transaction blocks throughout the hybrid block-chain ledger. In certain aspects, system 140 may also perform operations that generate and maintain additional private cryptographic keys (e.g., a private "crypto" key) associated with each owner associated with the assets tracked within the hybrid block-chain ledger (e.g., users 108, 110, and/or 112) and further, that would enable the owners to decrypt and access the list of triggering events and additionally or alternatively, the metadata identifying the rules authority. System 140 may store copies of the generated private crypto keys in a portion of data repository 144. Furthermore, system 140 may also perform operations that provide corresponding ones of the private crypto keys to users 108, 110, and/or 112 through secure, non-accessible and/or out-of-band communications.

The disclosed embodiments may also be configured to communicate the encrypted and/or hashed rules engine and list of triggering events to owners of and/or user associated with the tracked assets through "in-band" communication processes, such as through an incorporation of the encrypted rules engine and list of triggering events into the transaction blocks of the hybrid block-chain ledger. For example, system 140 may perform operations that hash the encrypted rules engine and list of triggering events into a genesis block of the hybrid block-chain ledger, the contents of which may be incorporated (e.g., by client devices 102, 104, and/or 106, peer systems 160, etc.) into each of the subsequent transaction blocks generated and appended to the hybrid block-chain ledger. In some aspects, by incorporating the hashed and encrypted rules engine and list of triggering events into blocks of the hybrid block-chain ledger, the disclosed embodiments may ensure that the established rules are followed even in an event of actions by malicious parties to disrupt the tracked assets (e.g., instances of Bitcoin™ peeling, etc.)

Further, in some instances, the additional private crypto keys held by the owners and/or users (e.g., stored in corresponding ones of client devices 102, 104, and/or 106 and accessible to executable application programs) may enable the owners and/or users to access the encrypted list of triggering events maintained within the hybrid block-chain ledger. The owners and/or user may, through corresponding client devices, view the individual events that, when detected by system 140, could cause system 140 to perform operations that recover, authorize, audit, and/or verify the transaction and/or ownership data included within the hybrid block-chain ledger (e.g., associated with corresponding portions of the tracked assets).

In certain aspects, one or more computing components of system 140 may perform operations that modify portions of the stored rules and/or list of triggering events, e.g., in response to changes in regulations and/or policies, in response to additional owner input, etc. In order to access and modify the generated rules engine (and/or the list of triggering events) maintained within the hybrid block-chain ledger, system 140 may leverage the stored master cryptographic key to access and modify the hashed and encrypted rules engine. System 140 may, in certain instances, encrypt and re-hash the modified rules engine and submit the encrypted and hashed modified rules engine to one or more of peer systems 160 for inclusion in a block of the hybrid block-chain ledger. For example, the one or more of peer systems 160 may incorporate the hashed and encrypted modified rules engine into the hybrid block-chain ledger as a special transaction (e.g., a "0" value transaction), such that the hybrid block-chain ledger tracks each change within the modified rules engine.

Figure 3:
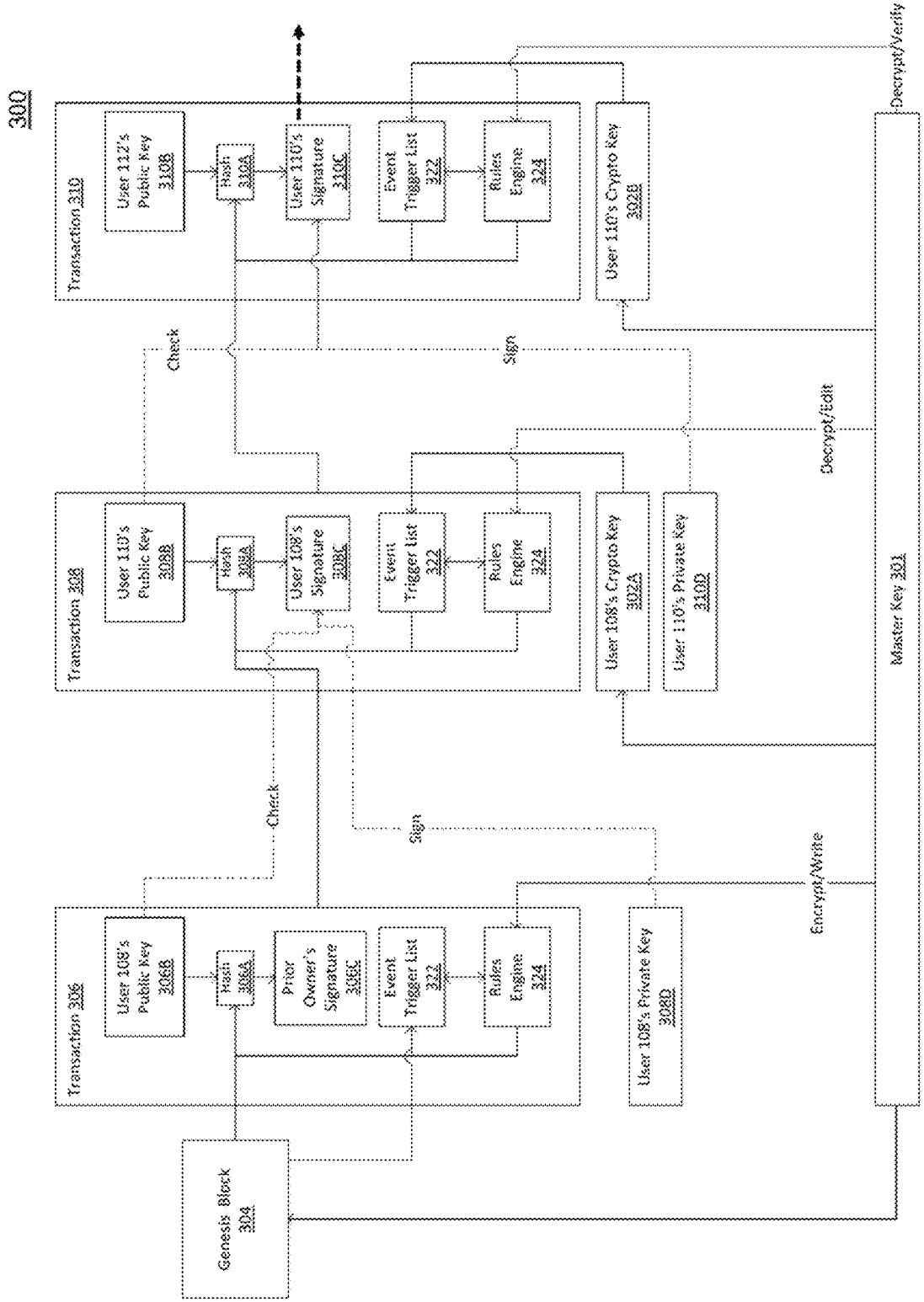
FIG. 3 is a schematic diagram illustrating a hybrid, public-private block-chain ledger architecture, consistent with disclosed embodiments.

FIG. 3 is a schematic diagram of illustrating an exemplary structure 300 of a hybrid, public-private block-chain ledger, which may be generated through the interaction of components of computing environment 100, in accordance with the disclosed embodiments. For example, as described in reference to FIG. 3, users 108, 110, and 112 may be associated with corresponding devices (e.g., client devices 102, 104, and 106), which may be configured to execute one or more stored software applications (e.g., a wallet application) capable of obtaining a current version of a hybrid block-chain ledger from one or more networked computer systems (e.g., one of peer systems 160 configured to "mine" broadcast transactions and update ledgers).

Further, in some aspects, and as described above, a system associated with a rules authority (e.g., system 140 associated with business entity 150) may generate a rules engine that regulate transactions involving the assets tracked by the hybrid block-chain ledger (e.g., distributions, transfers of ownership, other actions, etc.), and further, a list of triggering events that, upon detection by system 140, trigger an initiation of one or more of the distributions, transfers, and/or other actions regulated by the generated rules engine. In additional aspects, and as described above, system 140 may generate a master encryption key (e.g., master key 301 of FIG. 3), which may be system 140 may maintain in a portion data repository 144, and may generate additional private "crypto" keys 302A and 302B, which may be associated with corresponding ones of users 108 and 110 In some aspects, system 140 may maintain private crypto keys 302A, 302B, and 302C in a portion of data repository 144 and provide private crypto keys 302A, 302B, and 302C to users 108, 110, and 112 through secure, out-of-band communications. System 140 may, in additional aspects, encrypt the generated rules engine and the generated list of triggering events, and further, perform operations that hash the encrypted rules engine and list of triggering events into a genesis block of the hybrid block-chain ledger (e.g., genesis block 304).

In an embodiment, one of the users (e.g., user 108) may own and/or control a portion of the tracked assets. For example, a device associated with user 108 (e.g., client device 102) may execute a stored software application (e.g., a wallet application) capable of obtaining a current version of a hybrid block-chain ledger, including genesis block 304, from one or more networked computer systems (e.g., one of peer systems 160 configured to "mine" broadcast transactions and update ledgers). In some aspects, the current version of a hybrid block-chain ledger may represent a "longest" block-chain ledger than includes a maximum number of discrete "blocks," which may identify transactions that transfer, distribute, etc., portions of tracked assets among various owners, including user 108.

For example, client device 102 may obtain the current hybrid block-chain ledger, and may process the hybrid block-chain ledger to determine that a prior owner transferred ownership of a portion of the tracked assets to user 108 in a corresponding transaction (e.g., transaction 306, schematically illustrated in FIG. 3). As described above, one or more of peer systems 160 may have previously data verified, processed, and packed data associated with transaction 306, which may be into a corresponding block of the conventional block-chain using any of the exemplary techniques described above and/or apparent to one of ordinary skill in the art.

In some aspects, as illustrated in FIG. 3, data specifying transaction 306 may include input data that references one or more prior transactions (e.g., transactions that transferred ownership of the tracked asset portion to the prior owner), and further, output data that includes instructions for transferring the tracked asset portion to user 108. For example, and as described above, input data consistent with the disclosed embodiments may include, but is not limited to, a cryptographic hash of the one or more prior transactions (e.g., hash 306A), and output data consistent with the disclosed embodiments may include, but is not limited to, a quantity or number of units of the tracked asset portion that are subject to transfer in transaction 302 and a public key 306B of user 108 (i.e., the recipient of the tracked asset portion transferred in transaction 306). Further, in some aspects, the transaction data may include a digital signature 306θ of the prior owner, which may be applied to hash 306A and public key 306B using a private key of the prior owner through any of a number of techniques apparent to one of skill in the art and appropriate to the conventional block-chain ledger architecture.

Further, and in contrast to the conventional block-chain ledger architectures described above, transaction 306 may also include encrypted and/or hashed copies of rules engine 320 and trigger event list 322. In certain aspects, a device of the prior owner (e.g., which may execute one or more software applications) may access genesis block 304 (e.g., from the current version of the hybrid block-chain ledger obtained from one or more of peer systems 160), may parse genesis block 306, and may extract copies of the encrypted and/or hashed rules engine 324 and trigger event list 322. The prior owner's device may transmit to one or more of peer systems 160 along with the hash 306A, public key 306B, and digital signature 306C for verification, processing (e.g., additional cryptographic hashing) and inclusion into a new block of the hybrid block-chain ledger.

In an embodiment, user 108 may elect to further transfer that tracked asset portion to an additional user (e.g., user 110). For example, as described above, the one or more software applications executed by client device 102 may cause client device 102 to perform operations that generate input and output data specifying a new transaction (e.g., transaction 308 of FIG. 3) that transfers ownership of the tracked asset portion from user 108 to user 110, and further, that transmit the generated data to one or more of peer systems 160 for verification, processing (e.g., additional cryptographic hashing) and inclusion into a new block of the hybrid block-chain ledger.

For example, data specifying transaction 308 may include, but is not limited to, a cryptographic hash 308A of prior transaction 306, a quantity or number of units of the tracked asset portion that are subject to transfer in transaction 308, and a public key of the recipient (e.g., public key 308B of user 110). Further, in some aspects, the data specifying transaction 308 may include a digital signature 308θ of the user 108, which may be applied to hash 308A and public key 308B using a private key 308D of user 108 using any of the exemplary techniques described above. Further, and by way of example, the presence of user 108's public key within transaction data included within the conventional block-chain ledger may enable various devices and systems (e.g., client devices 102, 104, and/or 106, peer systems 160, etc.) to verify the user 108's digital signature 308D, as applied to data specifying transaction 308.

Additionally, and as described above, client device 102 may also parse data specifying prior transaction 306 (e.g., as obtained from the current version of the hybrid block-chain ledger) and extract encrypted and/or hashed copies of rules engine 324 and trigger event list 322. In certain aspects, client device 102 may append the encrypted and/or hashed copies of rules engine 324 and trigger event list 322 to the data specifying transaction 308 (e.g., cryptographic hash 308A, public key 308B, and digital signature 308C), and transmit the data specifying transaction 308B to one or more of peer systems 160 for verification, processing (e.g., additional cryptographic hashing) and inclusion into a new block of the hybrid block-chain ledger.

Further, and as described above, private crypto key 302A may enable client device 102 (e.g., associated with user 108) to access encrypted event trigger list 322 upon extracted from the hybrid block-chain ledger, as described above. In some embodiments, private crypto key 302A may provide client device 102 with read-only access to the encrypted event trigger list 322. In some aspects, client device 102 may obtain private crypto key 302A from system 140 using secured out-of-band communications, and additionally or alternatively, as input provided by user 108 through a web page or other graphical user interface (GUI) presented by client device 104.

In an embodiment, ownership of the tracked asset portion may be transferred from user 108 to user 110 upon verification and publication of the data specifying transaction 308 within a corresponding block of the hybrid block-chain ledger by peer systems 160. In further embodiments, and as described above, user 110 may elect to further transfer that tracked asset portion to yet another user (e.g., user 112). For example, as described above, the one or more software applications executed by client device 104 may cause client device 104 to perform operations that generate input and output data specifying a new transaction (e.g., transaction 310 of FIG. 3) that transfers ownership of the tracked asset portion from user 110 to user 112, and further, that transmit the generated data to one or more of peer systems 160 for verification, processing (e.g., additional cryptographic hashing) and inclusion into a new block of the hybrid block-chain ledger.

For example, data specifying transaction 310 may include, but is not limited to, a cryptographic hash 310A of prior transaction 308, a quantity or number of units of the tracked asset portion that are subject to transfer in transaction 310, and a public key 310B of user 112. Further, in some aspects, the data specifying transaction 310 may include a digital signature 310C of the user 110, which may be applied to hash 310A and public key 310B using a private key 310D of user 110, as described above. Additionally, and by way of example, the presence of user 110's public key 308B within transaction data included within the hybrid block-chain ledger may enable various devices and systems (e.g., client devices 102, 104, and/or 106, peer systems 160, etc.) to verify the user 110's digital signature 310C, as applied to data specifying transaction 310.

Additionally, and as described above, client device 104 may also parse data specifying prior transaction 308 (e.g., as obtained from the current version of the hybrid block-chain ledger) and extract encrypted and/or hashed copies of rules engine 324 and trigger event list 322. In certain aspects, client device 104 may append the encrypted and/or hashed copies of rules engine 324 and trigger event list 322 to the data specifying transaction 310 (e.g., cryptographic hash 310A, public key 310B, and digital signature 310C), and transmit the data specifying transaction 310 to one or more of peer systems 160 for verification, processing (e.g., additional cryptographic hashing) and inclusion into a new block of the hybrid block-chain ledger. In an embodiment, ownership of the tracked asset portion may be transferred from user 110 to user 112 upon verification and publication of the data specifying transaction 310 within a corresponding block of the hybrid block-chain ledger by peer systems 160.

Further, and as described above, private crypto key 302B may enable client device 104 (e.g., associated with user 110) to decrypt event trigger list 322 upon extraction from the hybrid block-chain ledger, as described above. In some aspects, client device 104 may obtain private crypto key 302B from system 140 using secured out-of-band communications, and additionally or alternatively, as input provided by user 110 through a web page or other graphical user interface (GUI) presented by client device 104. In other aspects, client device 104 may identify and extract private crypto key 302B from a portion of the hybrid block-chain ledger obtained from peer systems 160 (e.g., as a secure in-band communication).

In the embodiments described above, system 140 may establish and maintain rules (e.g., through a rules engine and corresponding list of triggering events) that facilitate regulatory-based, policy-based, and customer-specified controls of transactions involving assets tracked within a hybrid block-chain ledger. For example, client devices 102, 104, and/or 106 may generate transaction data that includes and rules engine and list of triggering events, and one or more of peer systems 160 may embed the generated transaction data into blocks of the hybrid block-chain ledger for reference in subsequent transactions. Further, in certain aspects, system 140 may be configured to detect an occurrence of an event (e.g., based on data received from client devices 102, 104, and/or 106, etc.), may determine whether the list of triggering events includes the detected event, and when triggering event list includes the detected event, perform one or more operations consistent with an established rule that references the detected event, as described below in reference to FIG. 4.

Figure 4:
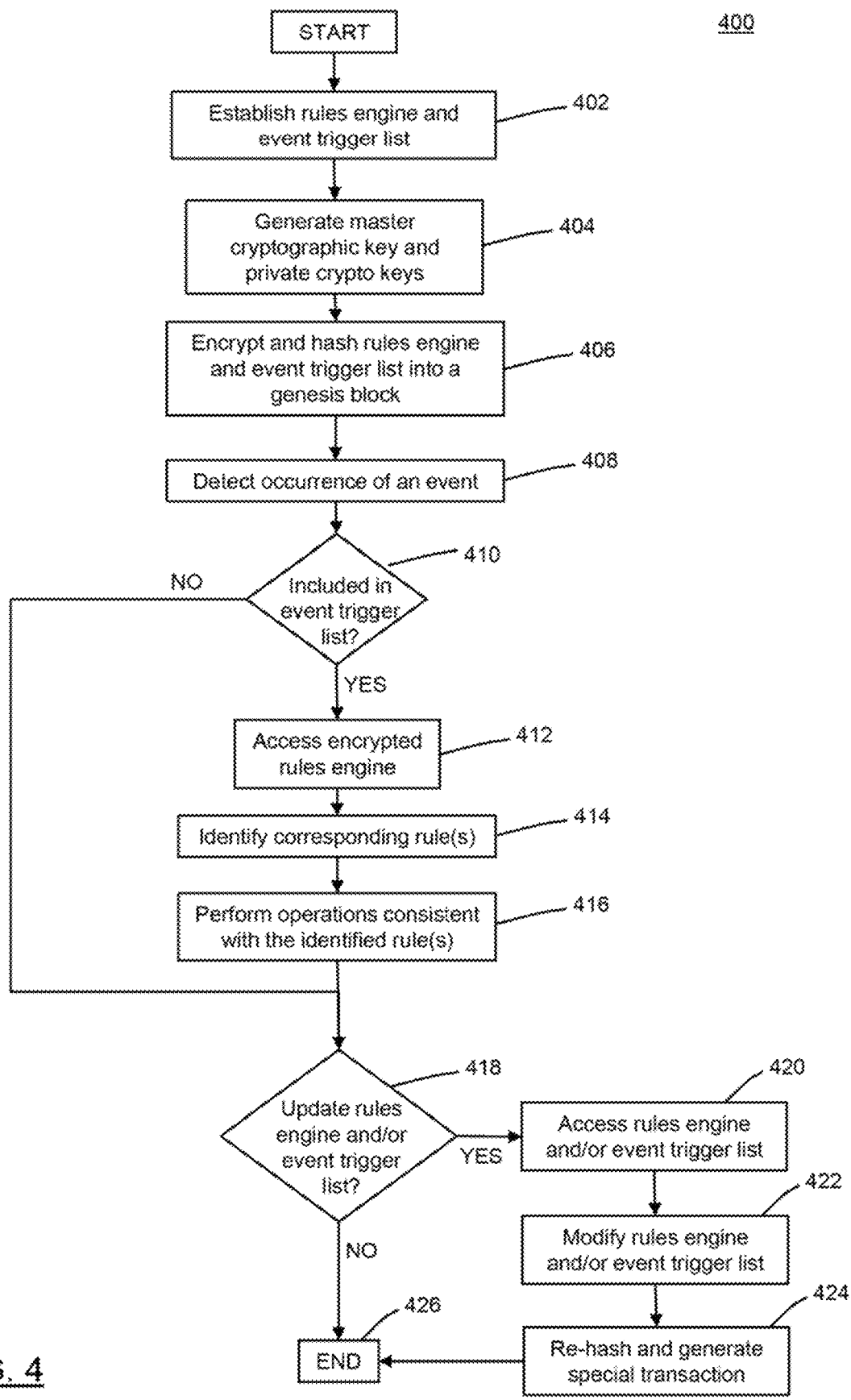
FIG. 4 is a flowchart of an exemplary process for performing operations in response to events tracked within a hybrid block-chain ledger, consistent with the disclosed embodiments.

FIG. 4 is a flowchart of an exemplary process 400 for automatically performing event-based operations on assets tracked within a hybrid block-chain ledger in accordance with disclosed embodiments. In an embodiment, a rules authority may be assigned to establish regulatory-based, policy-based, and customer-specified control over assets tracked within the hybrid block-chain ledger. In some aspects, tracked assets consistent with the disclosed embodiments may include, but are not limited to, units of a virtual currency or a crypto-currency, units of financial instruments held by one or more owners, and physical assets utilized by one or more individuals and/or entities. In some aspects, a computer system associated with the rules authority (e.g., system 140 associated with business entity 150) may execute one more stored application programs to cause system 140 to recover, authorize, audit, and/or verify an ownership of at least a portion of the tracked assets and/or transactions involving he tracked assets based on established and maintained rules.

In one aspect, one or more computing components of system 140 may generate a rules engine and a list of triggering events, which may be stored within a portion of data repository 144 (e.g., in step 402). For example, the generated and stored rules engine may identify or more rules that regulate a distribution of the tracked assets, an initiation of one or more transactions involving the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets tracked in the hybrid public-private ledger, etc.). Further, and as described above, the generated and stored list of triggering events may include information that specifies causal relationships between one or more of the established rules and one or more events that trigger an initiation of one or more corresponding regulated distributions, transfers, and/or actions involving assets tracked within the hybrid public-private ledger (e.g., the triggering events).

In certain instances, system 140 may establish, in step 402, one or more of the rules and/or triggering events to reflect regulations and/or policies promulgated by governmental entity, a financial regulator, and/or the rules authority. For example, system 140 may establish a loss of a private key by user 110 as a "triggering event" that would cause system 140 to perform operations that generate a new pair of public and private block-chain keys for user 110 in response to a verification of particular authentication credentials. Further, and by way of example, system 140 may deem a documented theft of a portion of the tracked assets a "triggering event" that would cause system 140 to perform operations recover the stolen portion of the tracked assets and generate a new pair of public and private block-chain keys for user 110.

In other instances, system 140 may establish, in step 402, one or more of the rules and/or triggering events based on information received from user 110 (e.g., as input provided to a web page or other graphical user interface (GUI) presented by client device 104 and provided to system 140). For example, user 110 may specify a particular distribution of tracked assets (e.g., recurring bill payments, etc.) in response to an accident involving user 110 and/or user 110's death (e.g., triggering events). The disclosed embodiments are, however, not limited to these exemplary triggering events and corresponding rules, and in further embodiments, system 140 may establish any additional or alternate rules and/or triggering events appropriate to the tracked assets, to business entity 150, and further, to users 108, 110, and 112.

Further, one or more computing components of system 140 may generate additional cryptographic keys that facilitate the exemplary regulation of transactions (e.g., distributions, transfers, and/or actions) involving assets tracked within the hybrid public-private ledger (e.g., in step 404). By way of example, in step 404, system 140 may generate a master cryptographic key with which system 140 may encrypt the generated and stored rules engine, as described above. In some aspects, certain aspects, system 140 may store copies of the generated master key in a portion of data repository 144 that is not accessible to user 110 (and any other users), thus maintaining a confidence of the generated master key.

Further, in step 404, system 140 may also perform operations that generate and maintain additional private cryptographic keys (e.g., private "crypto" keys) associated with each owner of the assets tracked within the hybrid block-chain ledger. As described above, the generated private crypto keys may enable a device of each of owner to decrypt and access the list of triggering events and additionally or alternatively, metadata identifying the rules authority. System 140 may store copies of the generated private crypto keys in a portion of data repository 144. Furthermore, system 140 may also perform operations that provide corresponding ones of the private crypto keys to users 108, 110, and/or 112 through secure, non-accessible and/or out-of-band communications.

In step 406, system 140 may perform operations that encrypt the generated and stored rules engine (e.g., using the master encryption key) and further, that encrypt the generated and stored list of triggering events (e.g., using any of the exemplary techniques described above that facilitate decryption using the private crypto keys). For example, system 140 may perform operations in step 406 that hash the encrypted rules engine and list of triggering events into a genesis block of the hybrid block-chain ledger, the contents of which may be incorporated (e.g., by client devices 102, 104, and/or 106, peer systems 160, etc.) into each of the subsequent transaction blocks generated and appended to the hybrid block-chain ledger. In some aspects, by incorporating the hashed and encrypted rules engine and list of triggering events into the blocks of the hybrid block-chain ledger, the disclosed embodiments may ensure that the established rules are followed even in an event of actions by malicious parties that disrupt the tracked assets (e.g., instances of Bitcoin™ peeling, etc.).

Further, in some embodiments, one or more computing components of system 140 may detect an occurrence of an event involving a portion of the tracked assets, an owner of a portion of the tracked assets, and/or a transaction involving a portion of the detected assets (e.g., in step 408). For example, system 140 may receive data from client device 104 that indicates user 110 lost a corresponding private block-chain key associated with a portion of the tracked assets. In other instances, system 140 may detect an event in step 140 based on data received across network 120 from one or more systems associated with local, state, and/or federal governmental entities (e.g., data from a law enforcement system notifying business entity 150 of a theft of a portion of the tracked assets, data from a local government confirming a death of an owner of a portion of the tracked assets, etc.), Further, in additional instances, system 140 may detect an occurrence of an event based on one or more sensors and devices communicatively connected to network 120 and capable of transmitting data to system 140. The disclosed embodiments are, however, not limited to these exemplary events, and in further embodiments, system 140 may be configured to detect any additional or alternate event appropriate to the tracked assets and to the components of computing environment 100.

System 140 may also be configured to access the stored list of triggering events (e.g., within database 144), and may determine whether the list of triggering events includes the detected event (e.g., in step 410). If system 140 were to identify the detected event within the list of triggering events (e.g., step 410; YES), system 140 may establish the detected event as a triggering event, and may access the encrypted rules engine using the master encryption key (e.g., in step 412). System 140 may further identify, within the accessed rules engine, one or more of the established rules that are causally related to the detected triggering event (e.g., in step 414). Further, in some aspects, system 140 may be configured to perform one or more operations, either individually or in sequence, that are consistent with the identified rules (e.g., in step 416). For example, the accessed rules engine may include information identifying the one or more operations associated with the identified rules. In other instances, at least one of the performed operations may represent a default operation associated with the identified rules (e.g., a specific type of authentication required before performing the one or more operations on behalf of user 110).

In one embodiment, one or more computing components of system 140 may also determine whether to update portions of the generated rules engine and/or list of triggering events (e.g., in step 418). For example, system 140 may identify an update or modification to one or more regulations and/or policies promulgated by governmental entity, a financial regulator, and/or the rules authority. In other instances, system 140 may obtain, from client device 104, information updating a rule and/or triggering event previously established by system 140 based on input received from user 110 (e.g., through a web page and/or GUI presented by client device 104).

If system 140 determines to update portions of the generated rules engine and/or list of triggering events (e.g., step 418; YES), system 140 may access appropriate portions of the rules engine and/or list or triggering events in step 420 (e.g., using the master encryption key and/or any of the exemplary techniques described above), and may modify the appropriate portions of the rules engine and/or list of triggering events to reflect the updated regulations, policies, user-specified rules, and/or user-specified events (e.g., in step 422). In some instances, system 140 may modify the accessed rules engine by adding a new rule, deleting an existing rule, modifying one or more parameters of an existing rule, and/or modifying one or more operations associated with an existing rule. In other instances, system 140 may modify the accessed list of event triggers to add a new triggering event, delete an existing triggering event, and/or add or modify parameters associated with an existing triggering event.

In some aspects, system 140 may encrypt and re-hash the modified rules engine and/or list of triggering events, and may submit the encrypted and hashed modified rules engine and/or list of triggering events to one or more of peer systems 160 for inclusion in a block of the hybrid block-chain ledger (e.g., in step 424). For example, one or more of peer systems 160 may incorporate the hashed and encrypted modified rules engine and/or list of triggering events into the hybrid block-chain ledger as a special transaction (e.g., a "0" value transaction), such that the hybrid block-chain ledger tracks each change within the modified rules engine and/or list of triggering events. Exemplary process 400 is then complete in step 426.

Referring back to step 418, if system 140 were to determine that no modification to the rules engine and/or the list of triggering events is warranted (e.g., step 418; NO), exemplary process 400 may pass forward to step 426, and exemplary process 400 is complete. Further, and in reference to step 410, if system 140 were to determine that the list of triggering events fails to include the detected event (e.g., step 410; NO), exemplary process 400 may pass forward to step 418, and system 140 may determine whether to update portions of the rules engine and/or list of triggering events using any of the exemplary processes described above.

In the embodiments described above, and through the generation of the master cryptographic key and management of the generated rules engine and corresponding list of triggering events, system 140 may perform operations that recover, authorize, audit, and/or verify an ownership of at least a portion of the tracked assets and/or transactions involving the tracked assets. In certain aspects, the operations performed by system 140, which utilize hybrid block-chain ledgers consistent with the disclosed embodiments, would not be possible using the conventional block-chain ledgers described above.

For example, user 110 may be an avid user of a virtual or crypto-currency (e.g., Bitcoin™), user 110 may store a private key (e.g., private key 310D) on a laptop computer (e.g., client device 104) to generate and confirm Bitcoin™ transactions. In one instance, user 110 may unfortunately drop the laptop into a swimming pool while confirming a Bitcoin™ with private key 310D, and upon retrieved from the swimming pool, user 110 may establish that the laptop no longer functions and that data on the laptop is not recoverable.

Through a device in communication with network 120 (e.g., user 110's smartphone), user 110 may access a conventional block-chain ledger, such as those conventional architectures outlined above, and determine that the Bitcoin™ transfer was incomplete when user 110 dropped the laptop into the swimming pool. Further, user 110 may determine that the Bitcoin™ transaction represents an orphaned block within the conventional block-chain ledger, and the Bitcoins™ associated with the orphaned block are unrecoverable and permanently lost.

In other aspects, user 110 may access a hybrid block-chain ledger (e.g., as described above in reference to FIG. 3), and may determine that the Bitcoin™ transfer was incomplete when user 110 dropped the laptop into the swimming pool. In an embodiment, however, user 110 may provide input to the smartphone identifying the unrecoverable private key, which the smartphone may transmit to system 140 across network 120. In some aspects, system 140 may receive the transmitted message (e.g., in step 408), may determine that user 110's loss of private key 310D represents a triggering event (e.g., step 410; YES), and may perform operations that authenticate user 110's identity and that regenerate a pair of private and public block-chain keys for user 110, which system 140 may transmit to user 110 through any of the secure non-accessible processes outlined above (e.g., in steps 412, 414, and 416). Upon receipt of the newly generated private key, user 110 may access the hybrid block-chain ledger (e.g., through the smartphone) and confirm the Bitcoin™ transfer to recover the crypto-currency.

Further, and by way of example, user 110 may access a wallet application executed by client device 104, and further, may determine that the mobile wallet is missing a number Bitcoins™. User 110 may suspect that the loss of the Bitcoins™ represents a theft by a malicious entity, and through a complex search of a corresponding block-chain ledger (e.g., conventional block-chain ledgers described above, and/or hybrid block-chain ledgers consistent with the disclosed embodiments), user 110 may trace the theft of the Bitcoins™ to a single transaction within a corresponding block. User 110 may contact the police e-crime unit and report the theft, and the police may confirm the accuracy of user 110's allegations regarding the theft.

User 110 may, in some instances, be capable of processing the conventional block-chain ledgers described above to determine an address of the malicious entity responsible for the theft. The decentralized and anonymous nature of conventional block-chain ledgers may, however, prevent user 110 from identifying the malicious entity, and the stolen Bitcoins™ may remain permanently unrecoverable.

The disclosed embodiments may, however, address the deficiencies of conventional block-chain ledgers and provide user 110 with recourse to recover the stolen Bitcoins™. For example, the police e-crime unit may notify the rules authority of the theft of user 110's Bitcoins™ and destination address associated with the malicious entity (e.g., through a message transmitted to system 140 and received, e.g., in step 408). System 140 may determine that the theft of the Bitcoins™ represents a triggering event included within the generated list (e.g., step 410; YES), and may perform operations that automatically create a request for a new transaction that returns the stolen Bitcoins™ to user 110 using any of the exemplary techniques described above (e.g., in steps 412, 414, and 416). System 140 may also perform operations that regenerate a pair of private and public block-chain keys for user 110, which system 140 may transmit to user 110 through any of the secure non-accessible processes outlined above (e.g., in steps 412, 414, and 416).

The hybrid block-chain ledger architectures described above may add a level of sophistication to conventional mechanisms for trustless communication by allowing transactions involving tracked assets to occur according to common transaction rules. Further, the hybrid block-chain ledger architectures consistent with the disclosed embodiments may allow owners of the tracked assets to project authority over the tracked assets by establishing customized rules for transaction authorization. Furthermore, and in contrast to the conventional techniques described above, the hybrid block-chain ledger architecture may enable a rules authority (e.g., business entity 150 associated with system 140) to recover, authorize, audit, and/or verify an ownership of at least a portion of the tracked assets and/or transactions involving the tracked assets based on established and maintained rules.

In the embodiments described above, and through the generation of a master cryptographic key and management of a generated rules engine and corresponding list of triggering events, system 140, acting as a rules authority, may perform operations that recover, authorize, audit, and/or verify an ownership of at least a portion of the tracked assets and/or transactions involving the tracked assets. In some aspects, and as outlined above, tracked assets consistent with the disclosed embodiments may include, but are not limited to, units of a virtual currency or a crypto-currency, units of financial instruments held by one or more owners, and physical assets utilized by one or more individuals and/or entities.

In additional aspects, the exemplary hybrid block-chain algorithms described above may track a location, performance, usage, and/or status one or more additional client devices (e.g., "connected devices) disposed within computing environment 100 (not shown in FIG. 1), which may be configured to establish communications with client devices 102, 104, and 106, and further, with system 140, using any of the communications protocols outlined above. For example, client device 102, 104, and 106, system 140, and the connected devices may be uniquely identifiable and addressable within communications network 120, and may be capable of transmitting and/or receiving data across the established communications sessions. Further, in some aspects, system 140 may be configured to establish the communications sessions with one or more of the connected devices, and to exchange data with the connected devices autonomously and without input or intervention from a user of client device 104 (e.g., user 110).

In some aspects, the connected devices may be implemented as a processor-based and or computer-based device that includes one or more processors and tangible, computer-readable memories, as described above in reference to client devices 102, 104, and 106. By way of example, connected devices consistent with the disclosed embodiments may include, but are not limited to mobile communications devices (e.g., mobile telephones, smart phones, tablet computers, etc.) and other devices capable of communicating with client device 104 (e.g., internet-ready televisions, internet-ready appliances and lighting fixtures, computing devices disposed within motor vehicles, etc.).

Further, in additional aspects, the connected devices may include sensor devices in communication with the one or more processors and the memories. The sensor devices may, in some aspects, be configured to monitor the usage, location, status, etc., of corresponding ones of the connected devices, and may be configured to provide sensor data to corresponding ones of the processors. In some aspects, the sensor data may include, but is not limited to, data identifying a current state, data specifying intended and/or unintended interaction with one or more of users 108, 110, and/or 112 (e.g., through client devices 102, 104, and/or 106), inadvertent interactions (e.g., drops, other accidental interactions, etc.), and data describing any additional or alternate characteristics of the connected devices capable of being monitored and quantified by the sensor devices.

In other aspects, computing environment 100 may include one or more additional computing systems in communication with the connected devices using any of the communications protocols outlined above. The additional computing system may, in an embodiments, may include one or more sensor devices capable of monitoring a location, performance, usage, and/or status of the connected devices, which may establish a "sensor network" capable of monitoring the connected devices. These additional computing systems may provide the additional sensor data to the connected devices using any of the communications protocols outlined above, either a regular intervals or in response to requests from the connected devices. In some instances, the additional computing systems may be implemented as processor-based and/or computer-based systems consistent with the exemplary systems described above.

In further aspects, the connected devices may be configured to transmit portions of the sensor data (e.g., as detected by on-board sensor devices and/or received from the sensor network) to client devices 102, 104, and/or 106 and additionally or alternatively, to system 140, using any of the communications protocols outlined above. By way of example, the sensor data may characterize and interaction between the connected devices and users 108, 110, and 112 (e.g., the monitored data may represent usage data indicative of a consumption of one or more services provided by the connected devices), and the connected devices and may transmit the usage data for users 108, 110, and/or 112 to corresponding ones of client devices 102, 104, and/or 106, which may store the received usage data in a corresponding data repository. In further aspects, the connected devices may also transmit the usage data to system 140, along with information linking specific elements of the usage data to corresponding users and/or client devices (e.g., user 110's usage data may be linked to an identifier of user 110 and/or of client device 104). In certain aspects, as described below in reference to FIGS. 5 and 6, client devices 102, 104, and/or 108 may also incorporate corresponding portions of the monitored data, e.g., as received from the connected devices, into hybrid block-chain ledgers consistent with the disclosed embodiments in order to record, track, and publicly monitor the location, performance, usage, and/or status of the connected devices.

Figure 5A:
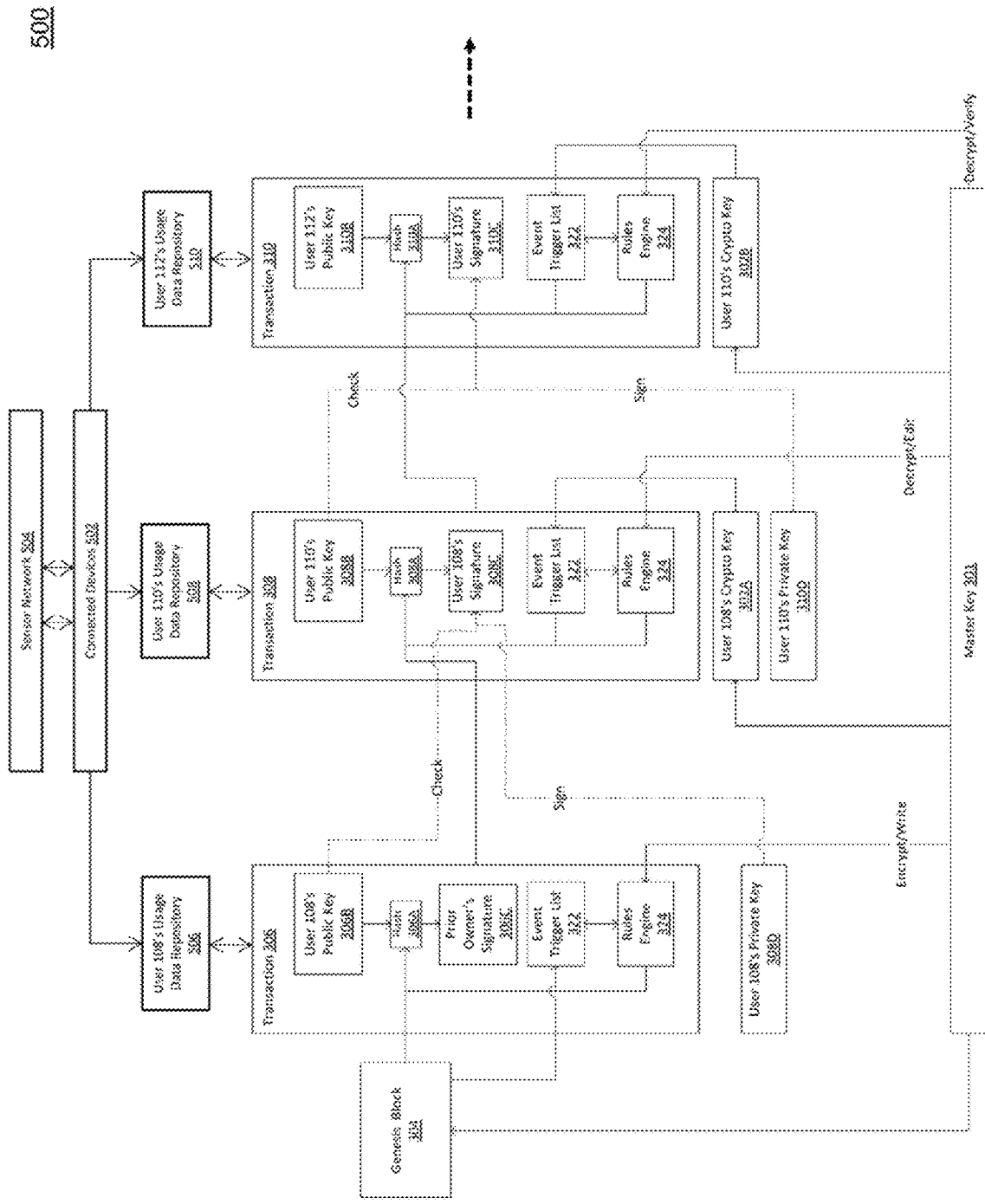
FIGS. 5A, 5B, 5C, and 6 are schematic diagrams illustrating additional hybrid, public-private block-chain ledger architectures, consistent with disclosed embodiments.
Figure 5B:
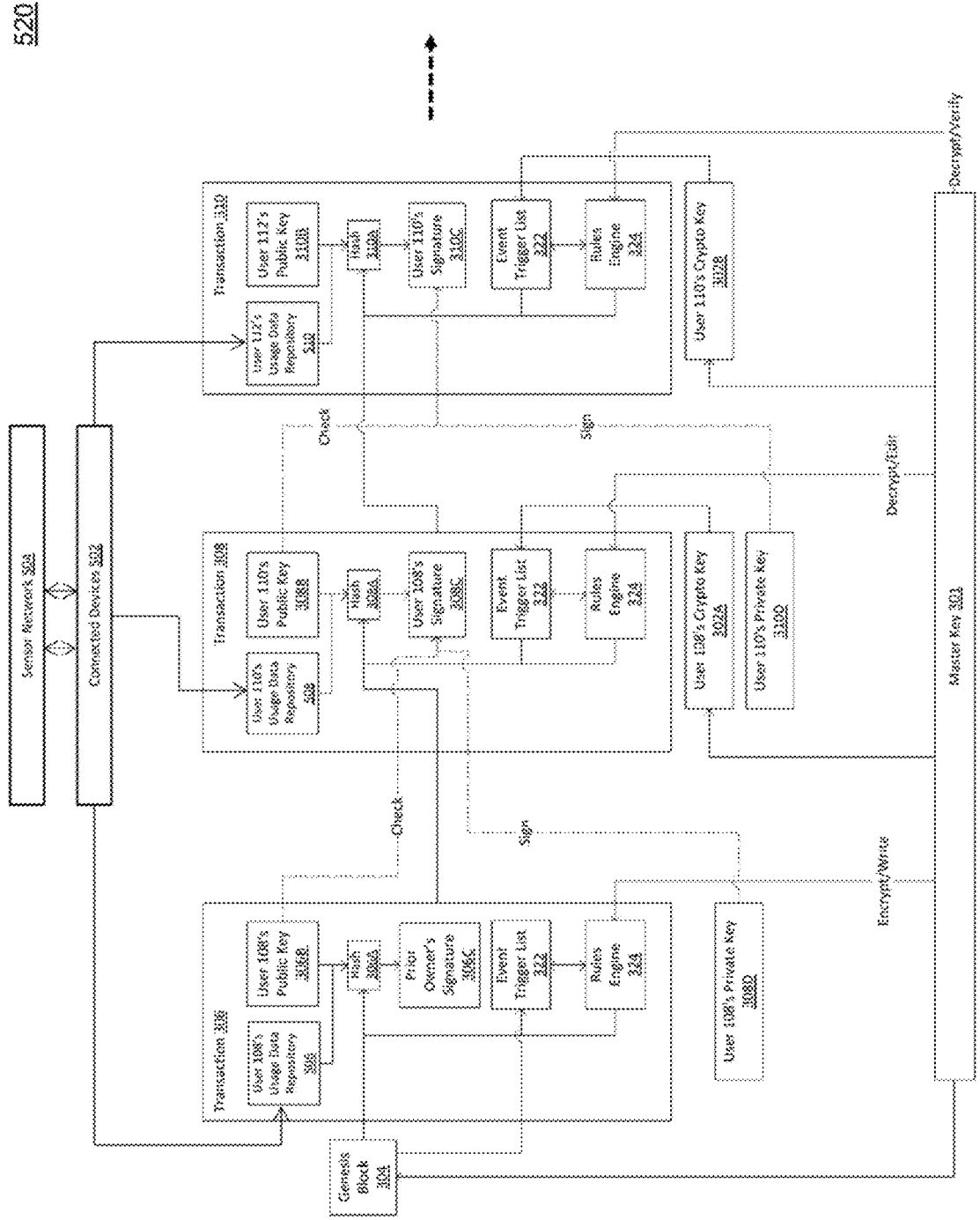

FIG. 5A is a schematic diagram illustrating an exemplary structure 500 of a hybrid, public-private block-chain ledger, which may be generated through the interaction of components of computing environment 100, in accordance with various embodiments. For example, as described in reference to FIG. 4, users 108, 110, and 112 may be associated with corresponding devices (e.g., client devices 102, 104, and 106), which may be configured to execute one or more stored software applications (e.g., a wallet application) capable of obtaining a current version of a hybrid block-chain ledger from one or more networked computer systems (e.g., one of peer systems 160 configured to "mine" broadcast transactions and update ledgers).

In some aspects, and as described above, the embodiments shown in FIG. 5A may incorporate the exemplary hybrid block-chain ledger described above in reference to FIG. 3 (e.g., hybrid block-chain ledger structure 300), and may augment hybrid block-chain ledger structure 300 to include and track monitored data indicative of a location, performance, usage, and/or status of one or more connected devices 502 disposed within environment 100 and in communication with client devices 102, 104, and 106. For example, connected devices 502 may be implemented as processor-based and/or computer-based systems that include one or more processors and corresponding tangible, non-transitory computer-readable memories.

Further, the one or more processors of connected devices 502 may obtain sensor data from one or more on-board sensor devices capable of monitoring connected devices 502 and additionally or alternatively, from one or more external sensor devices disposed within additional computing systems in communication with connected devices 502. The on-board and external sensor devices may, in some aspects, collectively form a sensor network 504 that generates and provides sensor data to the connected devices. For instance, and as described above, the sensor data may include, but is not limited to, data identifying a current state, data specifying intended and/or unintended interaction with one or more of users 108, 110, and/or 112 (e.g., through client devices 102, 104, and/or 106), inadvertent interactions (e.g., drops, other accidental interactions, etc.), and data describing any additional or alternate characteristics of the connected devices capable of being monitored and quantified by the sensor devices. In some aspects, the connected devices may be configured to transmit portions of the received sensor data to corresponding ones of client devices 102, 104, and 106, and to system 140, using any of the communications protocols outlined above (e.g., through peer-to-peer communications, etc.).

Figure 5C:
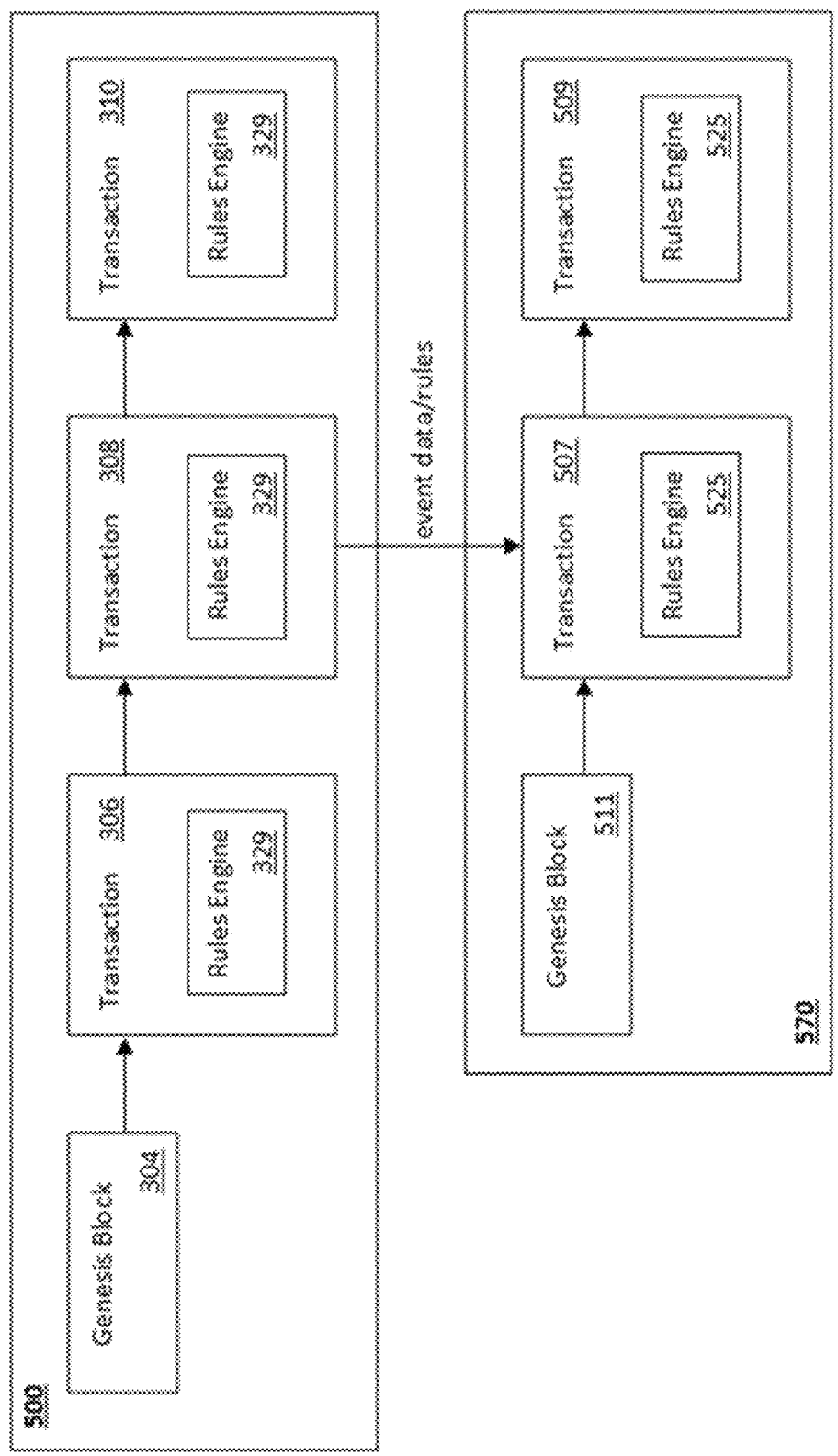

For example, the sensor data received by connected devices 502 may specify a usage or a consumption of one or more services of the connected devices by corresponding ones users 108, 110, and 112 (e.g., associated with client devices 102, 104, and 106). In some aspects, portions of the usage data attributable to corresponding ones of users 108, 110, and 112 may be transmitted to corresponding ones of client devices 102, 104, and 106, and further, to system 140. In further aspects, the user-specific portions of the usage data may be stored outside of the hybrid, block-chain data structures and within corresponding user-specific usage data repositories (e.g., usage data repositories 506, 508, and/or 510 of FIG. 5A). In other aspects, illustrated in FIG. 5B, the user-specific portions of the usage data may be stored within the hybrid, block-chain data structures and in decrypted form within corresponding user-specific usage data repositories (e.g., usage data repositories 516, 518, and/or 520 of FIG. 5B). FIG. 5C is a schematic diagram illustrating the exemplary structure 500 of FIG. 5A, and an additional exemplary structure 570 of an additional hybrid, public-private block-chain ledger, which may also be generated through the interaction of components of computing environment 100, in accordance with various embodiments. The hybrid, public-private block-chain ledger of the exemplary structure 500 may be associated with a first entity, while the additional hybrid, public-private block-chain ledger of the exemplary structure 570 may be associated with a second entity. As illustrated, the additional hybrid, public-private block-chain ledger of structure 570 includes a genesis block 511 and additional transactions 507 and 509. Each of the additional transactions 507 and 509 may be included within a corresponding block of the additional, hybrid public-private block-chain ledger, and each of additional transactions 507 and 509 may include an encrypted and/or hashed rules engine 525. As described herein, the additional hybrid, public-private block-chain ledger of the exemplary structure 570 may receive event data and/or rules (e.g., modified rules) from the hybrid, public-private block-chain ledger of the exemplary structure 500 for inclusion in a block of the additional hybrid, public-private block-chain ledger.

In some embodiments, as described below in reference to FIG. 6, client devices 102, 104, and/or 106, in conjunction with system 140, may augment the exemplary hybrid block-chain ledger structures described above to include usage data and corresponding metadata. Using the resulting hybrid block-chain ledger, one or more devices and systems operating within environment 10 may monitor the location, performance, usage, and/or status of the connected devices over time (e.g., during transfers in ownership of the connected devices, use of the connected devices as collateral, etc.).

Figure 6:
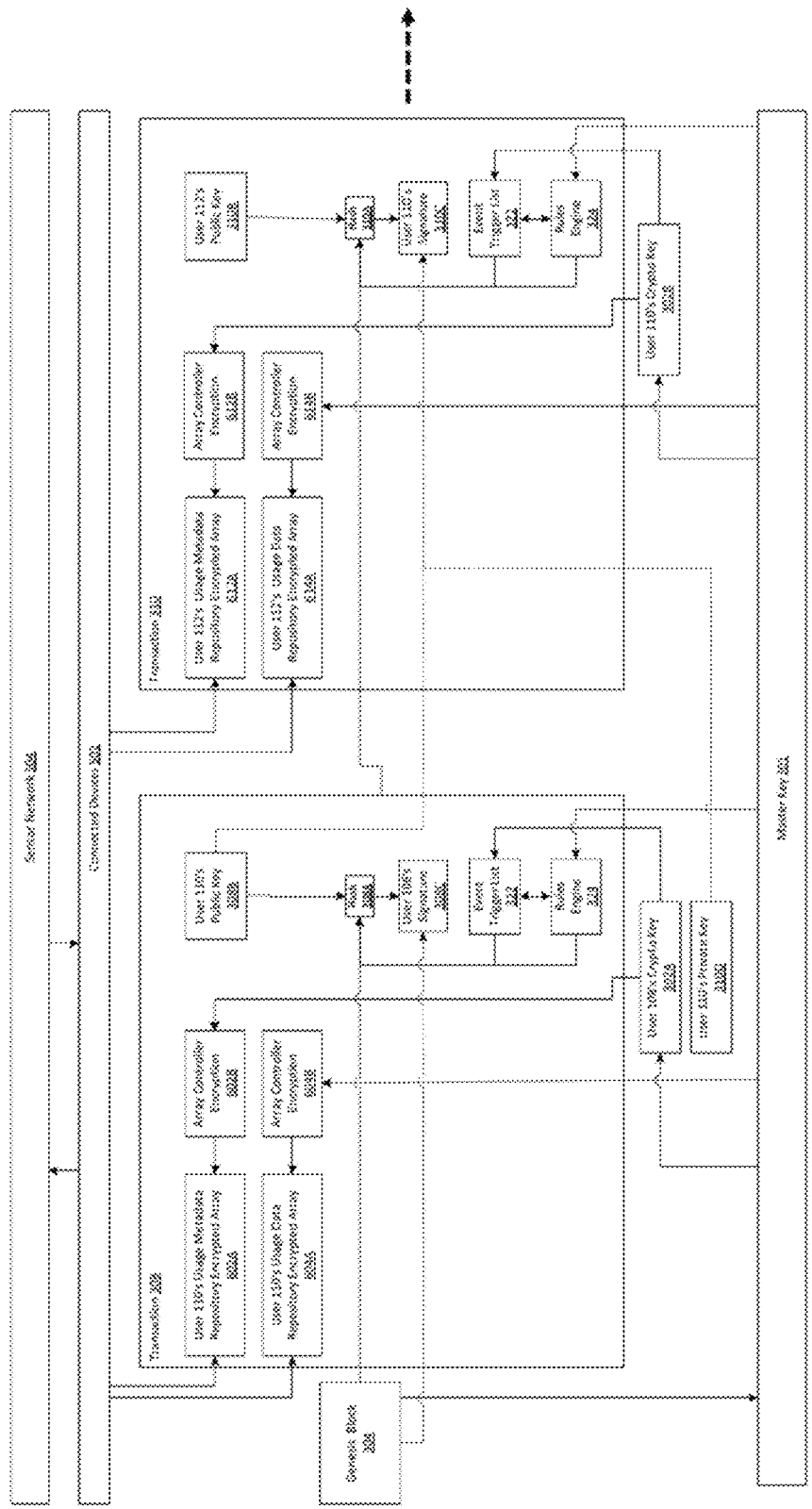

FIG. 6 is a schematic diagram of illustrating an exemplary structure 600 of a hybrid, public-private block-chain ledger, which may be generated through the interaction of components of computing environment 100, in accordance with the disclosed embodiments. For example, as described in reference to FIG. 6, users 108, 110, and 112 may be associated with corresponding devices (e.g., client devices 102, 104, and 106), which may be configured to execute one or more stored software applications (e.g., a wallet application) capable of obtaining a current version of a hybrid block-chain ledger from one or more networked computer systems (e.g., one of peer systems 160 configured to "mine" broadcast transactions and update ledgers).

In some aspects, and as described above, the embodiments described in FIG. 6 may incorporate the exemplary hybrid block-chain ledger described above in reference to FIGS. 3, 5A, 5B, and 5C (e.g., hybrid block-chain ledger structures 300 and 400), and may augment hybrid block-chain ledger structure 300 of FIG. 3 to include and track monitored data indicative of a location, performance, usage, and/or status of one or more connected devices 502 disposed within environment 100 and in communication with client devices 102, 104, and 106, as received from sensor network 404.

For example, and as described above, a prior user (e.g., user 108) may elect to further transfer a portion of tracked assets to an additional user (e.g., user 110). For example, as described above, the one or more software applications executed by client device 102 may cause client device 102 to perform operations that generate input and output data specifying a new transaction (e.g., transaction 308 of FIG. 6) that transfers ownership of the tracked asset portion from user 108 to user 110, and further, that transmit the generated data to one or more of peer systems 160 for verification, processing (e.g., additional cryptographic hashing) and inclusion into a new block of the hybrid block-chain ledger.

For example, data specifying transaction 308 may include, but is not limited to, a cryptographic hash 308A of a prior transaction (e.g., which transferred ownership to user 108), a quantity or number of units of the tracked asset portion that are subject to transfer in transaction 308, and a public key of the recipient (e.g., public key 308B of user 110). Further, in some aspects, the data specifying transaction 308 may include a digital signature 308C of the user 108, which may be applied to hash 308A and public key 308B using a private key 308D of user 108 using any of the exemplary techniques described above. As described above, the presence of user 108's public key within transaction data included within the conventional block-chain ledger may enable various devices and systems (e.g., client devices 102, 104, and/or 106, peer systems 160, etc.) to verify the user 108's digital signature 308D, as applied to data specifying transaction 308. Further, and as described above, client device 104 may also parse data specifying the prior transaction and extract encrypted and/or hashed copies of rules engine 324 and trigger event list 324.

Additionally, in some aspects, the data specifying transaction 308 may also include user 108's usage data (e.g., as received from connected devices 402 using any of the exemplary techniques described above), which may be encrypted using master key 301 (e.g., by array controller encryption 604B) to generate an encrypted array 604A of user 108's usage data. In further aspects, the data specifying transaction 308 may also include metadata indicative of a duration of usage, time, date, location, and/or other network connected devices in proximity, which may be encrypted using user 108 private crypto key 302A (e.g., by array controller encryption 602A) to generate an encrypted array of metadata 602A.

In certain aspects, client device 102 may append the encrypted and/or hashed copies of rules engine 324 and trigger event list 322 to the data specifying transaction 308 (e.g., cryptographic hash 308A, public key 308B, and digital signature 308O) and the usage data (e.g., encrypted arrays 602A and 604A and array controller encryption 602B and 604B), and transmit the data specifying transaction 308 to one or more of peer systems 160 for verification, processing (e.g., additional cryptographic hashing) and inclusion into a new block of the hybrid block-chain ledger.

In further embodiments, and as described above, user 110 may elect to further transfer that tracked asset portion to yet another user (e.g., user 112). For example, as described above, the one or more software applications executed by client device 104 may cause client device 104 to perform operations that generate input and output data specifying a new transaction (e.g., transaction 310 of FIG. 6) that transfers ownership of the tracked asset portion from user 110 to user 112, and further, that transmit the generated data to one or more of peer systems 160 for verification, processing (e.g., additional cryptographic hashing) and inclusion into a new block of the hybrid block-chain ledger.

For example, data specifying transaction 310 may include, but is not limited to, a cryptographic hash 310A of prior transaction 308, a quantity or number of units of the tracked asset portion that are subject to transfer in transaction 310, and a public key 310B of user 112. Further, in some aspects, the data specifying transaction 310 may include a digital signature 310C of the user 110, which may be applied to hash 310A and public key 310B using a private key 310D of user 110, as described above. Additionally, and by way of example, the presence of user 110's public key 308B within transaction data included within the hybrid block-chain ledger may enable various devices and systems (e.g., client devices 102, 104, and/or 106, peer systems 160, etc.) to verify the user 110's digital signature 310C, as applied to data specifying transaction 310.

Further, and as described above, data specifying transaction 310 may also include user 110's usage data (e.g., as received from connected devices 402 using any of the exemplary techniques described above), which may be encrypted using master key 301 (e.g., by array controller encryption 614B) to generate an encrypted array 614A of user 108's usage data. In further aspects, the data specifying transaction 308 may also include metadata indicative of a duration of usage, time, date, location, and/or other network connected devices in proximity, which may be encrypted using user 110's private crypto key 302A (e.g., by array controller encryption 612B) to generate an encrypted array of metadata 612A.

In certain aspects, client device 104 may append the encrypted and/or hashed copies of rules engine 324 and trigger event list 322 to the data specifying transaction 310 (e.g., cryptographic hash 310A, public key 310B, and digital signature 310C) and the usage data (e.g., encrypted arrays 612A and 614A and array controller encryption 612B and 614B), and transmit the data specifying transaction 310 to one or more of peer systems 160 for verification, processing (e.g., additional cryptographic hashing) and inclusion into a new block of the hybrid block-chain ledger.

In certain embodiments, as described above, the inclusion of usage data within hybrid block-chain ledgers maintains an continuous log of usage and/or consumption of connected-device resources by users 108, 110, and 112, and any additional or alternate users that generate and submit (through corresponding client devices) transaction data to one or more of peer systems 160. In further aspects, the sensor data (e.g., as received from connected devices 402) may be batched in a periodic set and treated as a transaction, and additionally or alternatively, may be appended into an associated repository of the transaction block-chain (e.g., using system 140, peer systems 160, etc.).

Further, in some aspects, the exemplary block-chain ledgers described above may facilitate processes that track an ownership of one or more of the connected devices and further, enable current owners (e.g., user 110) to transfer ownership to others (e.g., user 112). For example, when the disclosed embodiments create a new block to account for usage data, a private key of the current owner may be user to authenticate the usage and allow for the generation of the new block. In other aspects, a private key linked to a device of the current owner (e.g., stored locally on a memory of the current owner's device) may authenticate the usage and allow for the generation of the new block without input or intervention from the current owner. In some instances, the private key of the current owner's device may differ from the current owner's private key, Further, and in some embodiments, the automated and programmatic authentication of the usage by the current owner's device may reduce instances of under-reported usage data associated with owner-initiated authentication protocols.

III. Exemplary Processes for Tracking and Verifying Subdivided Asset Ownership using Hybrid, Block-Chain Ledger Data Structures In various embodiments, such as those described above, computer systems maintained by a rules authority (e.g., a financial institution, etc.) may augment conventional, decentralized block-chain ledger architectures by selectively encrypting ledger data to protect both a privacy of owners of tracked assets and a confidentiality of existing instruction sets maintained within the block-chain ledger. Further, by incorporating an encrypted rules engine and corresponding list of triggering events (e.g., an event trigger list) into each block of the conventional block-chain ledger architecture (and thus generating a hybrid, public-private block-chain ledger architecture), computer-implemented systems and methods consistent with the disclosed embodiments may perform operations that provide owners or holders tracked assets with recovery options in an event of fraud or malicious activity, while maintaining the public availability and verification characteristic of conventional block-chain ledgers.

a. Establishing and Tracking Subdivided Ownerships Interests, Rights, and Obligations using Hybrid, Block-Chain Ledger Data Structures In other aspects, one or more of the exemplary hybrid block-chain ledger architectures described above may provide a centralized and transparent mechanism to establish and subdivide ownership of corresponding assets or groups of assets, to establish rights and obligations resulting from and associated with the subdivided ownership, and further, to track an evolution of the subdivided ownership stakes and the corresponding rights and obligations over time. The disclosed embodiments may, for example, enable devices and systems associated with various entities (e.g., financial institutions, retailers, potential purchasers, etc.) to access one or more hybrid block-chain ledger data structures and, based on tracked ownership data, verify a party's ownership interest in an asset prior to initiating of a transaction involving that asset (e.g., a purchase of the asset, the party's pledge of the asset as collateral, etc.). Additionally, and based on a list of triggering events and a rules engine incorporated into each block of the hybrid block-chain ledgers (e.g., event trigger list 322 and rules engine 324), computer systems maintained by a financial institution, a governmental entity, and/or a regulatory entity (e.g., operating as a rules authority to modify and administer the list of triggering events and a rules engine) may detect an occurrence of one or more events involving a tracked asset or an owner of the tracked asset, and in response to the detected occurrence, perform operations consistent with the rules engine, as described below.

In one embodiment, the exemplary hybrid block-chain ledger architectures described above may provide a computationally efficient, centralized, and transparent mechanism for subdividing ownership interests in a particular asset among different individuals and/or entities, for allocating rights and obligations resulting from the subdivided ownership interests, and further, for tracking an evolution of the subdivided ownership interests, allocated rights, and allocated responsibilities across a lifetime of the particular asset. As described below, the subdivision of the particular asset's ownership, as tracked within data blocks of one or more of the exemplary block-chain ledger data structures, enables each partial owner to maintain explicit rights to use the jointly held asset (e.g., as set forth within a rules engine incorporated into each ownership block), and thus maintain sole responsibility for financing a corresponding portion of the jointly held asset. Further, the subdivision of ownership rights and responsibilities using one or more hybrid block-chain data structures, as described below, may enable multiple individuals and entities to enter into an agreement to purchase an asset, and further, to finance the purchase of that asset, without forming a shell entity to wholly own the property in question.

For instance, a first party and one or more second parties may each possess a mutual interest in acquiring a particular asset, and may agree to pool funds and purchase jointly the particular asset from a corresponding retailer. The first and second parties may include, but are not limited to, individuals, corporate entities, governmental and/or regulatory entities, and other juristic entities, such as partnerships. Additionally, and by way of example, the particular asset may include, but is not limited to, a parcel of real estate, investment assets, parcels of commodities (e.g., specie, investment-grade diamonds, etc.), consumer goods (e.g., one or more of connected devices 502), and other tangible objects whose purchase may be financed or collateralized by one or more financial institutions.

By way of example, the first party may represent a first individual (e.g., user 108) and the second party may represent a second individual (e.g., user 110), and users 108 and 110 may agree to purchase jointly a connected vehicle from a corresponding dealer for a sum of $45,000. The connected vehicle (e.g., one of connected devices 502) may, in some instances, include a storage device that stores one or more software applications, at least one processor that executes the one or more software applications, and further, a communications device that establishes and maintains communications with one or more systems and devices within environment 100 across network 120 (e.g., using any of the communications protocols outlined above).

As described above, the connected vehicle may include one or more integrated sensor devices and additionally or alternatively, may be communicatively coupled to one or more external sensor devices operating within an external sensor network (e.g., to sensor network 504 across network 120 or using peer-to-peer communication protocols, such as near-field communication (NFC) protocols). In some instances, one or more integrated sensor devices, and additionally or alternatively, one or more of the external sensor devices, may be configured to detect a location of the connected vehicle, performance characteristics (e.g., characteristics of the vehicle's performance, such as engine temperature, fuel-air mixture, emission characteristics, etc.), usage characteristics (e.g., a current mileage, a current speed, etc.), and additionally or alternatively, an operational status (e.g., data indicative of whether scheduled maintenance is required).

In an embodiment, and prior to purchasing the connected vehicle, users 108 and 110 may agree upon a distribution of ownership interests in the connected vehicle, which may establish the financial contribution of users 108 and 110. By way of example, users 108 and 110 may agree to each obtain an equivalent ownership interest in the vehicle (e.g., respective 50% shares), and further, to supply equivalent funds to purchase and maintain the connected vehicle. For instance, users 108 and 110 may each agree to supply $22,500 in funds to purchase the vehicle (e.g., using personal funds, negotiated financing, or a combination thereof), and further, may agree to split equally any further expenses resulting from taxes, insurance costs, official fees (e.g., title fees), governmental levies (e.g., inspection fees), and/or regular maintenance.

User 108 and 110 may also allocate jointly one or more ownership rights that govern, among other things, a usage of the connected vehicle after purchase and a distribution of proceeds from any eventual liquidation of ownership interest in the connected vehicle. For example, users 108 and 110 may agree upon a schedule of dates and/or times during which respective ones of users 108 and 110 may access and operate the connected vehicle for personal and/or commercial use (e.g., user 108 may operate the vehicle for personal use on Monday, Wednesday, Friday, and alternating Sundays, and user 110 may operate the vehicle for personal use on Tuesday and Thursday, and for commercial use on Saturdays and alternating Sundays). Further, user 108 and 110 may jointly establish that any proceeds that result from a sale of the connected vehicle would be distributed between users 108 and 110 in accordance with their respective ownership interests (e.g., distributed equally between users 108 and 110).

The disclosed embodiments are, however, not limited to the exemplary ownership interests and ownership rights described above. In further embodiments, users 108 and 110 may agree to distribute the purchase price of the connected vehicle, ownership interests, ownership rights, and ownership obligations in accordance with any additional or alternate mutually agreeable arrangement appropriate to the connected device and the interested parties.

Further, rather than fund a purchase of a 50% share in the connected vehicle using personal funds, user 108 may elect to obtain financing for the corresponding portion of the purchase price (e.g., $22,500) from a first financial institution (e.g., business entity 150) by pledging user 108's ownership interest in the connected vehicle as collateral. In certain aspects, user 108 may provide, to the first financial institution, information facilitating an application for credit to purchase the 50% share in the connected vehicle (e.g., to obtain a vehicle loan in an amount of $22,500). The application information may include, but is not limited to, information identifying the vehicle (e.g., a vehicle identification number (VIN), a MAC address identifying network-accessible computing components of the vehicle, and an IP address identifying networked vehicle), a cost of user 108's share in the vehicle ($22,500), information identifying the dealer, information identifying the agreed-upon distribution of ownership interests, rights, and obligations between users 108 and 110, and further, personal information identifying user 108 (e.g., governmental identifications numbers, employment history, residential history, etc.).

In some instances, a device of user 108 (e.g., client device 102), may access a web page or other graphical user interface (GUI) associated with the first financial institution (e.g., a GUI generated by a mobile application executed by client device 102), and may provide, as input to client device 102, data establishing at least a portion of the application information, which may package and transmit to a system maintained by the first financial institution (e.g., system 140). In further instances, user 108 may present additional portions of the application information (e.g., specific documents and/or forms of authentication) in person at a physical branch of the financial institution, and a representative of the financial institution may enter additional application information into a terminal disposed at the physical branch, which may transmit the additional application information to system 140.

System 140 may, in certain aspects, execute one or more software applications to store the application information in a portion of a locally accessible data repository (e.g., data repository 144) and process the application information against one or more underwriting standards established by the first financial institution. As an outcome of the processing, system 140 may generate one or more terms and conditions under which the first financial institution would finance the $22,500 purchase of user 108's one-half interest in the connected vehicle.

In some instances, these generated terms and conditions may establish a financing agreement between the first financial institution and user 108 for the purchase of the one-half share of the connected vehicle. For example, the financing agreement may include, but is not limited to, specific terms for the requested financing (e.g., and amount and a term of a loan, a fixed interest rate, a schedule by which an adjustable interest rate resets, etc.), a specific schedule by which user 108 services the financing (e.g., monthly payments of a specific amount), and one or more restrictions on the usage and maintenance of the connected vehicle (e.g., a requirement that the vehicle be serviced in accordance with a manufacturer-specific schedule, and/or a limitation on user 108's monthly usage of the connected vehicle).

Additionally, and by way of example, user 110 may elect to apply personal funds in an amount in the amount of $12,500 to the purchase of the connected vehicle, and may pursue $10,000 in financing from a second financial institution (e.g., business entity 151) sufficient to purchase the 50% share in the connected vehicle. In some aspects, any using any of the exemplary techniques described above, user 110 may provide, to second first financial institution, information facilitating an application for $10,000 in financing to complete user 110's purchase of the one-half share in the connected vehicle. As described above, the application information may include, but is not limited to, information identifying the vehicle (e.g., a vehicle identification number (VIN), a MAC address identifying network-accessible computing components of the vehicle, and an IP address identifying networked), an amount of request financing (e.g., $10,000), user 110's personal contribution (e.g., $12,500), information identifying the dealer, information identifying the agreed-upon distribution of ownership interests, rights, and obligations between users 108 and 110, and further, personal information identifying user 110 (e.g., governmental identifications numbers, employment history, residential history, etc.).

System 141 may, in certain aspects, execute one or more software applications to store the application information in a portion of a locally accessible data repository (e.g., data repository 146) and process the application information against one or more underwriting standards established by the second financial institution. As described above, system 141 may also generate date identifying one or more terms and conditions under which the second financial institution would provide $10,000 in financing to complete the purchase of user 110's one-half interest in the connected vehicle.

These generated terms and conditions may, in some instances, establish a financing agreement between the second financial institution and user 110 for user 110's purchase of the one-half share of the connected vehicle. For example, and as described above, the financing agreement may include, but is not limited to, specific terms for the requested financing (e.g., and amount and a term of a loan, a fixed interest rate, a schedule by which a variable interest rate resets and adjusts, etc.), a specific schedule by which user 110 services the financing (e.g., monthly payments of a specific amount), and one or more restrictions on the usage and maintenance of the connected vehicle (e.g., a requirement that the vehicle be serviced in accordance with a manufacturer-specific schedule, and/or a limitation on user 110's monthly usage of the connected vehicle).

Upon acceptance of the respective financing agreements by users 108 and 110, and subject to additional processing, systems 140 and 141 may executed software applications that provide the requested funds to support the joint purchase of the connected vehicle (e.g., $22,500 in financing for user 108's purchase of the one-half interest and $10,000 to support user 110's contribution to the purchase of the one-half interest). In some aspects, systems 140 and 141 may initiate operation to transfer the funds (e.g., an electronic funds transfer (EFT) transaction) to an account associated with the dealer or alternatively, the first and second financial institutions may issue a certified or cashier's check payable to the dealer.

Upon provision of the requested funds by systems 140 and 141, users 108 and 110 may initiate and complete the joint purchase of the connected vehicle from the dealer in accordance with the agreed-upon distribution of ownership interests, rights, and obligations. In some aspects, the dealer may provide users 108 and 110 with a bill of sale indicative of the transfer of the connected vehicle from the retailer to users 108 and 110, and users 108 and 110 may present the bill of sale to governmental entity 152 (e.g., a provincial ministry of transportation or a state department of motor vehicles (DMV)). Upon payment of appropriate taxes and registration fees, a computer system maintained by governmental entity 151 (e.g., system 145) may issue a formal title that indicates of the joint ownership of the connected vehicle by users 108 and 110 and further, identifies the liens attached to the connected vehicles by the first and second financial institutions (e.g., resulting from their respective financing of the of the interests of users 108 and 110 in the vehicle).

In certain aspects, conventional processes for title and deed recordation, such as those described above, may provide basic notice that users 108 and 110 jointly own the connected vehicle and further, that one or more financial institutions or governmental entities possess a partial ownership interest in the connected vehicle through corresponding attached and perfected liens. These conventional processes may, however, be inadequate to subdivide ownership interests, rights, and obligations associated with the connected vehicle between users 108 and 110, and further to track an evolution of these ownership interests, rights, and obligations over a lifecycle of the connected vehicle. These conventional techniques may also be inadequate to track a compliance of users 108 and 110 with agreed-upon restrictions usage, such as those described above.

By way of example, devices held by users 108 and 110 (e.g., client devices 102 and 104) may be execute stored software applications (e.g., mobile wallet applications provided by one or more of systems 140 and 141) that access and view hybrid block-chain ledger data structures established and maintained by one or more of peer systems 160, and further, that transmit data to one or more of peer systems 160 for inclusion within newly generated blocks of the hybrid block-chain ledger data structures. For instance, and upon execution of one or more of the stored software applications, client device 102 may generate and present a graphical user interface (GUI) that facilitates user 108's input of transaction data characterizing user 108's purchase of a portion of the connected device from the retailer and further, data characterizing the ownership rights and obligations allocated to user 108 through mutual agreement with user 110. Similarly, and by way of example, client device 104 may present a GUI that facilitates user 110's input of transaction data characterizing user 110's purchase of a portion of the connected device from the retailer and further, data characterizing the ownership rights and obligations allocated to user 110 through mutual agreement with user 108.

For example, the transaction data input to client device 102 by user 108 may include, but is not limited to, an identifier of the retailer, a purchase date, a total transaction amount (e.g., $45,000) and a portion of the transaction allocated to user 108 (e.g., $22,500), user 108's ownership interest in the connected vehicle (e.g., a 50% interest) and the rights and obligations allocated to user 108 in view of the 50% ownership interest (e.g., a 50% share in taxes, insurance, fees and levies, and usage restrictions specifying that user 108 may operate the vehicle for personal use on Monday, Wednesday, Friday, and alternating Sundays). The transaction data input to client device 104 by user 110 may include, but is not limited to, an identifier of the retailer, a purchase date, a total transaction amount (e.g., $45,000) and a portion of the transaction allocated to user 108 (e.g., $22,500), user 108's ownership interest in the connected vehicle (e.g., a 50% interest) and the rights and obligations allocated to user 110 in view of the 50% ownership interest (e.g., a 50% share in taxes, insurance, fees and levies, and usage restrictions specifying that user 110 may operate the vehicle for personal use on Tuesday and Thursday, and for commercial use on Saturdays and alternating Sundays). In further aspects, the transaction data input to client devices 102 and 104 may also include, among other things, information identifying a financial institution that financed the purchase transactions (e.g., the first or second financial institution) and amounts financed (e.g., $22,500 for user 108, and $10,000 for user 110).

In some aspects, client devices 102 and 104 may be configured by the executed software applications to package and store the input transaction data into corresponding data structures within locally accessible memories, and further to transmit portions of the stored transaction data to one or more peer systems 160 across network 120 using any of the communications protocols outlined above. Peer systems 160 may, in certain aspects, competitively process the transaction data received from client devices 102 and 104 in conjunction with additional data received from systems 140 and 141 to generate a new data block of a hybrid, block-chain data structure that tracks the purchase of the connected vehicle and the transfer of ownership from the dealer to users 108 and 110, and further, to the first and second financial institutions by virtue of their respective liens on portions of the connected device, as described below.

In further aspects, and consistent with the disclosed embodiments, systems 140 and 141 may execute software instructions to generate transaction data supporting a creation of the new data block of the hybrid, block-chain data structure described above. In certain aspects, the transaction data generated by systems 140 and 142 may not only characterize a partial ownership interest of the first and/or second financial institutions in corresponding portions of the connected vehicle (and thus, establish a lien on the corresponding portions). For example, system 140 may be configured to include, within corresponding transaction data, information characterizing the joint purchase of the connected vehicle, which includes, but is not limited to, information identifying the dealer, a purchase price of the connected vehicle (e.g., $45,000), a purchase date, and information identifying the connected device for tracking and verification (e.g., a VIN, a MAC address identifying network-accessible computing components of the vehicle, and an IP address identifying networked). The generated transaction data may also characterize the first financial institution's partial interest in user 108's one-half share of the connected vehicle, which includes, but is not limited to, a principal amount (e.g., $22,500), terms of the financing (e.g., an interest rate, a term of the financing, any penalties for early repayment), a repayment schedule (e.g., an amount and due dates of monthly payments), and further, any restrictions on usage imposed by the first financial institution (e.g., regular maintenance, etc.).

Additionally, and by way of example, transaction data generated by system 141 may include information characterizing the joint purchase of the connected vehicle, which includes, but is not limited to, information identifying the dealer, the purchase price of the connected vehicle (e.g., $45,000), a purchase date, and the information identifying the connected device for tracking and verification. The generated transaction data may also characterize the second financial institution's partial interest in user 110's one-half share of the connected vehicle, which include, but is not limited to, a principal amount (e.g., $10,000), user 110's personal contribution (e.g., $12,500), terms of the financing (e.g., an interest rate, a term of the financing, any penalties for early repayment), a repayment schedule (e.g., an amount and due dates of monthly payments), and further, any restrictions on usage imposed by the second financial institution (e.g., regular maintenance, no commercial use, etc.).

In certain aspects, systems 140 and 141 may be configured to process and store the generated transaction data into a corresponding data structure within a locally accessible memory (e.g., data repositories 144 and 146), and may transmit the stored transaction data to one or more of peer systems 160 across network 120 using any of the communications protocols outlined above. Using any of the exemplary techniques described above, peer systems 160 may competitively process the transaction data received from systems 140 and 141, in conjunction with similar data received from client devices 102 and 104, to generate the new data block of a hybrid, block-chain data structure that tracks the purchase of the connected vehicle and the transfer of ownership from the dealer to users 108 and 110, and further, to the first and second financial institutions by virtue of their respective liens on portions of the connected device, as described below.

Further, in the embodiments described above, client devices 102 and 104, and systems 140 and 141, generate and transmit to peer systems 160 exemplary transaction data that characterizes the ownership interests, rights, and obligations of users 108 and 111, and further, that characterizes the partial and time-evolving ownership interests of the first and second financial institutions in the corresponding portions of the connected device. The disclosed embodiments are, however, not limited to the exemplary transaction data described above, and in further embodiments, client devices 102 and 104, and systems 140 and 141, may generate and transmit any additional or alternate transaction data that characterizes the relationship between users 108 and 110 and further, that characterizes the relationships between users 108 and 110 and corresponding ones of the first and second financial institutions, including images and/or textual portions of the bill of sale for the connected device and the financing agreements between users 108 and 110 and their corresponding financial institutions.

Further, in certain embodiments described above, client devices 102 and 104 transmit transaction data characterizing the agreed-upon distribution of ownership interests, rights, and obligation to peer systems 160, and systems 140 and 141 transmit, to peer systems 160, transaction data characterizing the partial ownership interests of the first and second financial institutions in corresponding portions of the connected device. The disclosed embodiments are, however, not limited to such transmitted transaction data, and in further embodiments, any additional or alternate device of system in communication with peer systems 160 may provide transaction data characterizing the subdivided ownership of the connected device and/or the partial ownership interests of the first and second financial institutions. For example, a computer system maintained by the dealer may provide, to peer systems 160, transaction data characterizing the subdivided ownership of the connected device and/or the partial ownership interests of the first and second financial institutions. Further, in certain instances, systems 140 and/or 141 may provide, to peer systems 160, transaction data characterizing the subdivided ownership to augment, or replace, transaction data provided by client devices 102 and 104.

In an embodiment, peer systems 160 may receive transaction data from client devices 102 and 104, and from systems 140 and 141 (and from any additional or alternate device or system operating within environment 100). In some aspects, one or more of peer systems 160 may act as "miners" for the block-chain ledger, and may competitively process the received transaction data (either alone or in conjunction with other data) to generate a new ledger block, which may be appended to the block-chain ledger and distributed across peer systems 160 (e.g., through a peer-to-peer network) and to other devices operating within environment 100.

In some aspects, the new ledger block may include data tracking and recording the interactions of users 108 and 110 with the dealer (e.g., to purchase the connected device) and corresponding ones of the first and second financial institutions (e.g., which financed all or a portion of the ownership interests of users 108 and 110). For example, the new ledger block may include data that identifies a first purchase transaction through which user 108 obtained a 50% share in the connected vehicle (e.g., in exchange for $22,500 in funds), and further, identifies the ownership rights and obligations allocated to user 108 through mutual agreement with user 110 (e.g., a 50% share in taxes, insurance, fees and levies, and usage restrictions specifying that user 108 may operate the vehicle for personal use on Monday, Wednesday, Friday, and alternating Sundays), In certain instances, the new ledger block will also include information identifying the lien imposed on user 108's portion of the connected vehicle by the first financial institution, which resulted from the first financial institution's funding of the $22,500 purchase of user 108's share in the connected vehicle, along with terms, conditions, and limitations imposed on user 108 by the first financial institution in exchange for the financing. For example, and as described above, the new ledger block may record, for inspection by users 108 and 110, and by the first and second financial institutions, specific terms for the provided financing (e.g., the $22,500 principal, a term of a loan, an interest rate, etc.), a specific schedule by which user 108 services the financing (e.g., monthly payments of a specific amount), and one or more restrictions on the usage and maintenance of the Internet-connected vehicle (e.g., a requirement that the vehicle be serviced in accordance with a manufacturer-specific schedule, and/or that the vehicle be operated only for personal use, etc.).

In further instances, the new ledger block may include additional data that identifies a second purchase transaction through which user 110 obtained a 50% share in the connected vehicle (e.g., in exchange for $22,500 in funds), and further, identifies the ownership rights and obligations allocated to user 110 through mutual agreement with user 108 (e.g., a 50% share in taxes, insurance, fees and levies, and usage restrictions specifying that user 110 may operate the vehicle for personal use on Tuesday and Thursday, and for commercial use on Saturdays and alternating Sundays). The new ledger block may also include information identifying the lien imposed on user 110's portion of the connected vehicle by the second financial institution, which resulted from the second financial institution's funding of a $10,000 portion of user 110's share in the connected vehicle, along with terms, conditions, and limitations imposed on user 110 by the second financial institution in exchange for the financing. For example, and as described above, the new ledger block may record, for inspection by users 108 and 110, and by the first and second financial institutions, specific terms for the provided financing, including, but not limited to, the $10,000 principal, user 110's personal contribution (e.g., $12,500), terms of the financing (e.g., an interest rate, a term of the financing, any penalties for early repayment), a repayment schedule (e.g., an amount and due dates of monthly payments), and further, any restrictions on usage imposed by the second financial institution (e.g., regular maintenance, no commercial use, etc.).

Further, and as described above, one or more of peer systems 160 may access a prior block of the hybrid, block-chain ledger data structure that tracks the ownership of the connected vehicle, and may access an encrypted list of event triggers (e.g., event triggers list 322) and an encrypted rules engine (e.g., rules engine 324), which peer systems 160 may hash into the new ledger block using any of the exemplary techniques described above. For example, the list of triggering events may include information identifying one or more events reflective of a change in an ownership interest in the connected vehicle, including, but not limited to, a sale, a transfer of an ownership interest, an attachment of a lien to a particular ownership stake, and a release of the an attached lien. Additionally or alternatively, the list of triggering events may identify one or more events that modify a partial interest of the first and/or second financial institutions in various portions of the connected vehicle held by users 108 and/or 110, which include, but are not limited to, an initiation or execution of a regularly scheduled payment and a modification and/or recession of one or more terms in a corresponding financing agreement, Additionally or alternatively, the list of triggering events may also identify an event related to a receipt of aggregated and/or classified sensor data, either from an integrated sensor device or an external sensor device operation within the external sensor network.

Rules engines consistent with the disclosed embodiments may, in some aspects, initiate a generation of a new data block in response to a detected change in ownership and/or in response to the received sensor data. Additionally or alternatively, the rules engine may include rules that facilitate implementation and/or provision of the agreed-upon ownership rights and obligations allocated to users 108 and 110, including, but not limited to, an agreed-upon disbursement of proceeds from a sale of the connected vehicle to the joint owners and/or lien holders, and further, an initiation processes to electronically transfer portions of the proceeds to the partial owners and/or lien holders. In other aspects, the rules included within the rules engine may specify that the first and/or second financial institution (e.g., through systems 140 and/or 141) may modify a portion of one of the financing agreements (e.g., increase a variable interest rate, assess a financial penalty, etc.) in response to a violation by user 108 and/or 110 of a corresponding usage restriction or an repayment schedule imposed by the first and/or second financial institutions as a condition of financing.

In further instances, as described above, systems 140 and/or 141 may operate a rules authority, and may execute software instructions to decrypt a rules engine and/or an event trigger list included within an updated version of the hybrid private-public ledger data structure that tracks the subdivided ownership of the connected vehicle (i.e., the latest, longest hybrid private-public ledger) using any of the exemplary techniques described above. Systems 140 and/or 141 may modify or augment a portion of the decrypted rules engine and/or event triggers list to incorporate data indicative of one or more of the ownership rights and obligations allocated to users 108 and 100 by mutual agreement (e.g., agreed-upon usage restrictions, agreed-upon disbursement processes, etc.) and additionally or alternatively to incorporate data indicative of the terms and conditions set forth within corresponding financing agreements between the users 108 and 110 and corresponding ones of the first and second financial institutions.

Systems 140 and/or 141 may, in some aspects, encrypt the modified rules engine and/or event triggers list using any of the exemplary techniques described above, and provide the encrypted, but modified, rules engine and/or event triggers list to peer systems 160 for incorporation into the new ledger block of the hybrid private-public ledger data structure, as outlined above. The disclosed embodiments are, however, not limited to these exemplary triggering events and rules, and in additional embodiments, and as described below, the list of triggering events and rules may include any additional or alternate events and rules agreed-upon by the joint owners and lien holder and appropriate to the tracked asset (i.e., the connected vehicle).

In some aspects, peer systems 160 may access the updated version of the hybrid private-public ledger data structure that tracks the subdivided ownership of the connected vehicle (i.e., the latest, longest hybrid private-public ledger), and process a final block of that data structure to access the event trigger list and rules engine, which may be hashed into the new ledger block using any of the exemplary techniques described above. In some aspects, when users 108 and 110 jointly purchase a "new" connected vehicle, the latest version of the hybrid private-public ledger data structure may include only a genesis block, which may be generated by a manufacturer of the connected vehicle using any of the techniques outlined above. By establishing and maintaining the hybrid private-public ledger data structure based on a genesis block generated by the manufacturer of the connected vehicle, the disclosed embodiments may enable one or more of devices 102 and 104, systems 140 and 141, and other devices and systems operable within environment 100 to track an evolution of an ownership and/or usage of the connected vehicle throughout its lifecycle.

By way of example, the new ledger block may encoded using a Base58 encoding scheme (e.g., as employed for block-chain ledgers memorializing transactions involving Bitcoin™ virtual currencies). The disclosed embodiments are, however, not limited to these exemplary encoding schemes, and in further embodiments, peer systems 160 may encode the new ledger block using a human readable cryptograffiti encoding scheme, which may simplify the blockchain data structure. Further, and by way of example, the new ledger block generated by peer systems 160 may be structure to include, among other things: a block header (which identifies an address of a prior block); an identifier of the corresponding one or peer systems 160 that created the additional ledger block; a rules header that identifies the integrated and/or external sensor devices and includes a rules associate key (e.g., that associates a rule to the Internet-connected device); an encrypted list of event triggers and an encrypted rules engine; a header for the received transaction data; and the received transaction data written into the hybrid, block-chain data structure. In certain instances, peer systems 160 may write the transaction data into the additional ledger block as HEX, Unicode, a combinations of the two, and/or any additional or alternate encoding suitable for the transaction data and the new ledger block.

As described above, peer systems 160 may append the new ledger block to the existing hybrid, block-chain ledger data structure for the connected device (e.g., to generate an updated hybrid, block-chain ledger data structure), which may be distributed across peer systems 160 (e.g., through a peer-to-peer network) and to other devices operating environment 100 (e.g., across network 120). In some aspects, client devices held by one or more of users 108 and 110 may execute software applications that access portions of the generated hybrid, block-chain ledger data structure and that present, to corresponding ones of users 108 and 110 through a graphical user interface (GUI), portions of the newly added ledger block in read-only format. By accessing and viewing portions of the hybrid, block-chain ledger data structure, user 108 and/or user 110 may identify not only a corresponding ownership interest, but also the obligations and usage restrictions imposed by mutual consent and in exchange for financing provided by the first and second financial institutions.

Further, in some aspects, the presented portions of the hybrid, block-chain ledger data structure may identify, to users 108 and/or 110, various actions that could be taken by a corresponding financial institution should an imposed obligation or usage restriction be violated. For example, user 108 may determine, based on the presented portion of the hybrid, block-chain ledger data structure, that the first financial institution may impose a financial penalty and/or increase a variable interest rate should user 108 miss a schedule payment or violate a usage restriction (e.g., miss a scheduled maintenance appointment for the connected vehicle).

In further aspects, representatives of the first and second financial institutions may access portions of the hybrid, block-chain ledger data structure (e.g., through corresponding devices executing software applications) and determine whether imposed terms and conditions conflict not only with terms and conditions imposed by other financial institutions, but with other restrictions imposed by mutual consent of the partial owners (e.g., users 108 and 110). Additionally or alternatively, systems maintained by other financial institutions and retailers operating within environment 100 may access the hybrid, block-chain ledger data structure described above, and may verify not only a subdivided ownership of the connected vehicle, but also liens and other encumbrances on particular portions of the connected vehicle that would limit the ownership interest and rights of a corresponding owner. For example, user 110 may attempt to pledge the 50% share in the connected device as collateral in a transaction involving a retailer, and the retailer (through a corresponding retailer device executing an appropriate software application) may determine that the second financial institution holds a lien on user 110's portion of the connected vehicle, thus rendering that portion of the connected vehicle inappropriate for use as collateral for the transaction.

In additional embodiments, the hybrid, block-chain ledger data structures described above may establish a temporal evolution of the subdivided ownership of the connected device, the rights and obligations allocated to partial owners 108 and 110 both by mutual consent and by financial institutions, and further, the partial ownership interest of these financial institutions in the connected device. As described above, the financial institutions' partial and time-evolving interest may protect the financing provided by these financial institutions. Further, subsequent to the initial purchase and financing of the connected vehicle, the disclosed embodiments may enable computer systems associated with the first and/or second financial institution (e.g., systems 140 and 141) and computer systems associated with various governmental entities (e.g., system 146), to detect an occurrence of an event relating to or modifying an ownership interest in the connected device and to perform operations responsive to the detected event (e.g., as outlined in an encrypted rules engine). The performed operations may, for example, include generating additional transaction data indicative of the detected event and the perform operations, which may be transmitted to peer systems 160 for competitive processing and incorporation into an additional block of the hybrid, block-chain ledger data structure.

For example, and as described above, users 108 and 110 may obtain a bill of sale indicative of a transfer of the connected vehicle from the retailer to users 108 and 110, and users 108 and 110 may present the bill of sale to governmental entity 152 (e.g., a provincial ministry of transportation or a state department of motor vehicles (DMV)). In some aspects, users 108 and 110 may contribute equal funds to pay appropriate taxes and registration fees. In response to the payment, system 145 of governmental entity 152 may issue a formal title indicative of the joint ownership of the connected vehicle by users 108 and 110 and further, identifying the liens attached to the connected vehicles by the first and second financial institutions (e.g., resulting from their respective financing of the of the interests of users 108 and 110 in the vehicle).

In one embodiment, system 145 may execute software applications to generate "transaction" data confirming the payment of the taxes and fees (e.g., an amount of taxes and fees and a timestamp of the payment) and confirming the issuance of the title (e.g., including a title number, a VIN of the connected vehicle, and/or an image of the title). In certain aspects, system 145 may transmit the generated transaction data to peer systems 160 across network 120. Using any of the exemplary techniques described above, peer systems 160 may competitively process the transaction data received from system 145 to generate the new data block of a hybrid, block-chain data structure that confirms the payment of the taxes and fees and the issuance of the formal title for the connected vehicle, which may be distributed across peer systems 160 (e.g., through a peer-to-peer network) and to other devices operating environment 100 (e.g., across network 120).

In further embodiments, systems 140, 141, and/or 145 may detect occurrences of additional events that impact an individual or shared ownership interest of users 108 and/or 110 and further, that impact a partial ownership interest held by the first and second financial institutions in the connected vehicle. Based on an accessed and decrypted event triggers list and rules engine, systems 140, 141, and/or 145 may perform one or more operations consistent with the detected event, as described below in reference to FIG. 7A.

Figure 7A:
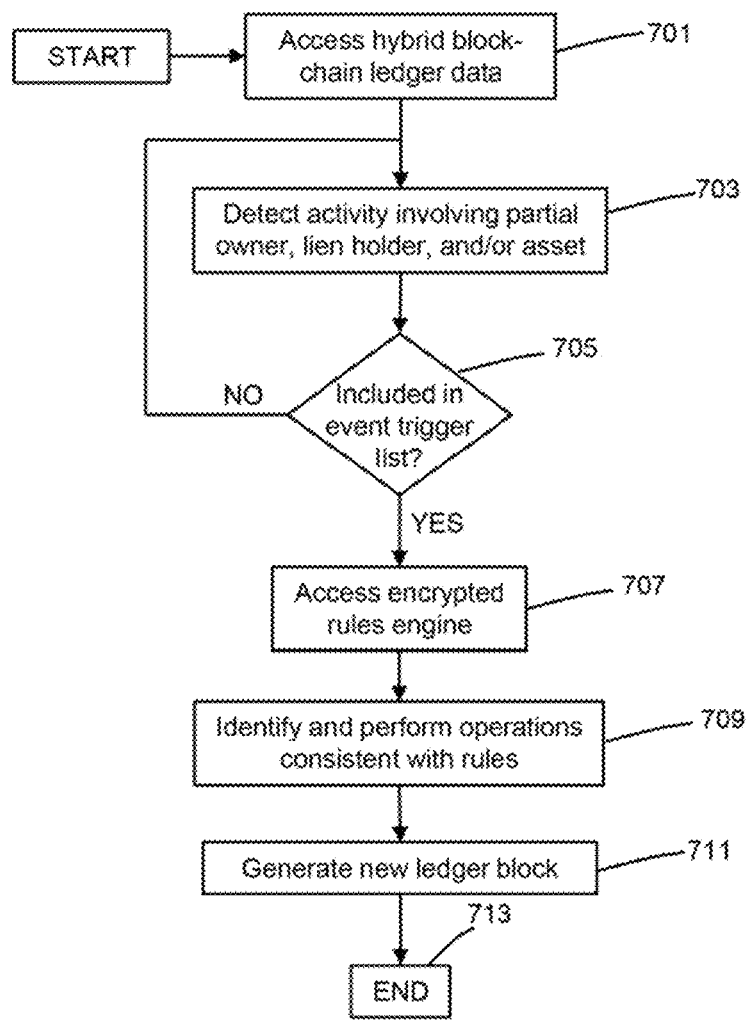
FIGS. 7A and 7B are flowcharts of exemplary processes for performing operations in response to events tracked within a hybrid block-chain ledger, consistent with the disclosed embodiments.

FIG. 7A is a flowchart of an exemplary process 700 for automatically performing operations consistent with a detected change in an ownership interest of an asset tracked within a hybrid block-chain ledger, in accordance with disclosed embodiments. In some aspects, a computer system maintained by a rules authority (e.g., system 140) may store within a locally accessible data repository (e.g. data repository 144) and/or obtain across network 120 data indicative of a hybrid, block-chain ledger that tracks subdivided ownership interests, rights, and obligations in a particular, asset, such as the connected vehicle described above.

In certain aspects, system 140 may access data corresponding to a stored hybrid, block-chain ledger that tracks the subdivided ownership interests, rights, and obligations of a particular asset, (e.g., in step 701). Further, in step 703, system 140 may detect activity that involves a partial owner of the tracked asset, a lien holder of the tracked asset (e.g., a financial institution), and/or an operation of the tracked asset by a partial owner. For example, system 140 may obtain information that user 108 initiated an electronic funds transfer (EFT) transaction (e.g., through a web page or other GUI rendered for presentation by client device 102) to satisfy of a scheduled monthly payment to the first financial institution (e.g., as set forth in the corresponding financing agreement, which includes terms and conditions for the $22,500 financing for user 108's 50% share in the connected vehicle).

System 140 may, in some aspects, access the stored list of triggering events (e.g., within database 144), and in step 705, may determine whether the list of triggering events indicates that the detected activity impacts or modifies an ownership interest of the partial owner or the lien holder. For example, in step 705, system 140 may determine that the initiated payment represents an event that modifies a partial ownership interest of the first financial institution in user 108's one-half portion of the connected vehicle.

In additional aspects, system 140 may execute software applications to obtain an encrypted rules engine (e.g., within database 144), which system 140 may decrypt and access in step 707 (e.g., using the master encryption key). System 140 may parse the decrypted rules engine to identify one or more rules associated and consistent with the detected activity and corresponding event within the accessed event triggers list, and system execute software applications that perform operations consistent with the identified one or more rules (e.g., in step 709). In some aspects, system 140 may execute software applications to generate transaction data associated with the performed operations, which may be transmitted to one or more of peer systems 160 for inclusion within a new block of the hybrid, block-chain ledger using any of the exemplary processes described above (e.g., in step 711). Exemplary process 700 is then complete in step 713.

Further, if system 140 were to determine that the detected activity does not impact or modify an ownership interest of the partial owner or the lien holder (e.g., step 705; NO), exemplary process 700 may pass back to step 703, and system 140 may detect an activity that involves one of the partial owners, the lien holders, and of the connected vehicle using any of the exemplary techniques described above.

For example, system 140 may determine that the identified event (e.g., user 108's initiated payment) corresponds to rules instructing system 140 to perform operations that generate a new ledger block that reflects user 108's scheduled payment and its modification to the first financial institution's partial ownership interest in user 108's portion of the connected vehicle. In some aspects, system 140 may generate transaction data that identifies the initiation of user 108's scheduled payment (e.g., the scheduled payment amount and a timestamp of the initiated payment) and further, identifies a corresponding reduction in a principal amount owed to the first financial institution. System 140 may, in some aspects, transmit the generated transaction data to peer systems 160 across network 120. Using any of the exemplary techniques described above, peer systems 160 may competitively process the transaction data received from system 146 to generate the new data block of a hybrid, block-chain data structure that confirms user 108's initiated payment and confirms the resulting change in the partial ownership interest (e.g., based on a reduction in the principal amount owed to the first financial institution by user 108). As described above, one or more of peer systems 160 may distribute the newly updated hybrid, block-chain data structure across peer systems 160 (e.g., through a peer-to-peer network) and to other devices operating environment 100 (e.g., across network 120).

In further aspects, system 140 may detect not only the initiation of the payment by user 108 (e.g., through client device 102), but may also determine that the initiated payment completes the payment schedule set forth in the financing agreement between user 108 and the first financial institution and additionally or alternatively, a full payment that liquidates any remaining portion of the financing provided by the first financial institution (e.g., a "payoff" amount specified by the first financial institution in the financing agreement). Accordingly, upon completion of the final and/or full payment, the partial ownership interest held by the first financial institution in user 110's portion of the connected vehicle will be liquidated, and user 108 will own the corresponding portion of the connected vehicle without encumbrance.

System 140 may, as described above, generate transaction data that identifies the initiation of user 108's final scheduled payment (e.g., the scheduled payment amount and a timestamp of the initiated payment) and further, reduces a principal amount owed to the first financial institution to zero. Additionally or alternatively, system 140 may generate transaction data that identifies the initiation of user 108's full payment (e.g., the payoff amount and a timestamp of the initiated payment), In certain aspects, system 140 may transmit the generated transaction data to peer systems 160 across network 120. Using any of the exemplary techniques described above, peer systems 160 may competitively process the transaction data received from system 146 to generate the new data block of a hybrid, block-chain data structure that confirms user 108's initiated payment and confirms the resulting change in the partial ownership interest. As described above, one or more of peer systems 160 may distribute the newly updated hybrid, block-chain data structure across peer systems 160 (e.g., through a peer-to-peer network) and to other devices operating environment 100 (e.g., across network 120).

Additionally, system 140 may continue to monitor the status of the initiated payment, and may detect an execution of a funds-transfer transaction corresponding to the initiated final payment and/or full payment. In response to the detected execution of the transaction, system 140 may generate transaction data that "releases" the lien held by the first financial institution on user 110's portion of the connected vehicle and indicates that user 110 owns one-half of the connected vehicle without encumbrance. As described above, system 140 may transmit the generated transaction data to peer systems 160, which may generate the new data block of a hybrid, block-chain data structure that confirms the release of the prior lien by the first financial institution, and which may distribute the newly updated hybrid, block-chain data structure across peer systems 160 (e.g., through a peer-to-peer network) and to other devices operating environment 100 (e.g., across network 120). In certain aspects, the newly updated hybrid, block-chain data structure may provide notice to other users, financial institutions, and retailers that user 108 owns one-half of the connected vehicles without encumbrance and that user 108's portion of the connected vehicle may be pledged as collateral in other transactions.

In further aspects, system 140 may obtain information indicating that users 108 and 110 intend to liquidate their partial ownership interests in the connected vehicle by selling the vehicle to a third party, such as user 112. For example, system 140 may obtain information identifying an electronic transfer of funds to purchase the vehicle from an account of user 112 to an account of user 110, with a notation that the funds are intended to purchase the connected vehicle (e.g., an identify a VIN of the vehicle). In other aspects, system 140 may parse the hybrid, block-chain data structure associated with the connected vehicle to determine, from one or more data blocks established by system 145 (e.g., associated with governmental entity 152) that users 112 submitted a bill of sale requesting transfer of title from users 108 and 110 to user 112. The disclosed embodiments are, however, not limited to these exemplary informative mechanisms, and system 140, acting as a rules authority, may detect the impending sale of the connected vehicle using any additional or alternate mechanism appropriate to system 140, devices 102, 104, and 106, and the connected vehicle.

Upon identification of the pending sale, system 140 may access and decrypt a stored rules engine, such as that described above, to determine an agreed-upon allocation of proceeds from the sale of the connected vehicle. For example, the decrypted rules engine may indicate that users 108 and 110 agree to split any processed equitably, subject to outstanding liens on respective portions of the connected vehicle held by user 108 and user 110. In certain aspects, system 140 may execute software applications that parse the hybrid, block-chain data structure associated with the connected vehicle to identifying any partial interests held by financial institutions in the respective portions of connected vehicle. System 140 may further perform operations that partition the proceeds into equal shares (e.g., for user 108 and 110), apply corresponding shares of the proceeds to satisfy any outstanding lines on the corresponding portions of the connected vehicle, and further, to initiate a transfer of any residual funds to accounts of user 108 and user 110.

b. Enhanced Processes for Tracking and Validating Ownership Interests, Rights, and Obligations Using Connected Sensor Networks As described above, the partial owners of the connected vehicle may establish, through mutual consent, one or more usage restrictions on the connected vehicle (e.g., that user 108 may operate the vehicle for personal use on Monday, Wednesday, Friday, and alternating Sundays, and that user 110 may operate the vehicle for personal use on Tuesday and Thursday, and for commercial use on Saturdays and alternating Sundays). Further, in some embodiments, the financing agreements between the first financial institution and user 108 and between the second financial institution and user 110 may establish additional usage restrictions that limit the ownership rights of users 108 and 110 in exchange for the desired financing.

For example, the first financial institution may, as a condition for providing the $22,500 in financing, require that user 108 obtain service for the connected vehicle in accordance with a manufacturer-specific schedule, operate the Internet-connected vehicle only for personal use, and accrue less than 3,000 miles per month from that personal use. Additionally, and by way of example, the second financial institution may, as a condition for providing the $10,000 in financing, require that that the connected vehicle accrues less than 5,000 miles per month from commercial uses. In one embodiment, and to facilitate compliance with the usage restrictions established by the partial owners and imposed by the financial institutions, peer systems 160 may augment the exemplary hybrid, block-chain ledgers described above to include data sensor data obtained from integrated sensor devices incorporated into the connected vehicle and additionally or alternatively, from external sensor devices operating within an external sensor network, as described below.

The connected vehicle may, in come aspects, include one or more integrated sensor devices and additionally or alternatively, may be communicatively coupled to one or more external sensor devices operating within an external sensor network (e.g., to sensor network 504 across network 120 or using peer-to-peer communication protocols, such as near-field communication (NFC) protocols). In some instances, one or more integrated sensor devices, and additionally or alternatively, one or more of the external sensor devices, may be configured to detect a location of the connected vehicle, performance characteristics (e.g., characteristics of the vehicle's performance, such as engine temperature, fuel-air mixture, emission characteristics, etc.), usage characteristics (e.g., a current mileage, a current speed, etc.), and additionally or alternatively, an operational status (e.g., data indicative of whether scheduled maintenance is required).

The connected vehicle may, for example, obtain integrated sensor data indicative of the location, performance characteristics, usage characteristics, and/or operational status of the connective device from the one or more integrated sensor devices. In some instances, one or more processors of the connected vehicle may execute software applications aggregate the obtained integrated sensor data over a predetermined temporal interval (e.g., hourly, daily, weekly, monthly, etc.) and store the integrated sensor data in a corresponding data structure (e.g., within a locally accessible data repository). Further, and in accordance with the predetermined temporal intervals, the connected vehicle may be configured to transmit a portion of the integrated sensor data to one or more computer systems (e.g., system 140, system 141, and/or peer systems 160) across network 120. The connected vehicle may, in other instances, transmit an identifier of the connected vehicle and/or the integrated sensor devices (e.g., a MAC address, an IP address, etc.), timestamps, and/or identifiers of a type of data (e.g., location, usage, performance, status, etc.) to the one or more computing devices concurrently with the integrated sensor data.

In further aspects, one or more of the external sensor devices within the external sensor network may also be configured to detect the location, performance characteristics, usage characteristics, and/or operational status of the connected vehicle, and in some aspects, may provide the external sensor data to the connected vehicle for aggregation, storage, and transmission to system 140, system 141, and/or peer systems 160, as described above. In other aspects, however, the external sensor devices may be configured to the provide the external sensor data to an additional computing system that administers the external sensor network for aggregation, storage, and transmission to system 140, system 141, and/or peer systems 160, and additionally or alternatively, may be configured to transmit portions of the external sensor data across network 120 directly to system 140, system 141, and/or peer systems 160. The external sensor devices may, in certain instances, transmit an identifier of the external sensor devices (e.g., a MAC address, an IP address, etc.), timestamps, and/or identifiers of a type of data (e.g., location, usage, performance, status, etc.) to the one or more computing systems concurrently with the external sensor data.

In certain aspects, and using any of the exemplary techniques described above, peer systems 160 may competitively process the received sensor to generate an additional ledger block representative of the location, usage, performance, and/or status of the Internet-connected device at a particular point in time (e.g., at a timestamp associated with the received data) or aggregated over a particular predetermined interval. By way of example, and using any of the exemplary techniques described above, peer systems 160 may incorporate the additional ledger block into a corresponding usage data repository within the hybrid, block-chain data structure (e.g., within usage data repositories 516, 518, and 530 of FIG. 5B, and/or within usage data repositories 604A and 604B of FIG. 6), or outside the hybrid, block-chain data structure (e.g., usage data repositories 506, 508, and 510 of FIG. 5A). Further, in additional aspects, peer systems 160 may also incorporate metadata that further characterizes portions of the sensor data (e.g., timestamps, identifiers of the integrated and/or external sensor devices, etc.) in a corresponding usage metadata repository (e.g., usage metadata repositories 602A and 602B of FIG. 6). Additionally, and as described above, peer systems 160 may include data identifying the integrated and/or external sensor devices within a rules header of the additional ledger block, which, as described above, may provide the rules engine a mapping of all connected sensor devices, both integrated into the Internet-connected device and operating within the external sensor network.

In one aspect, client devices 102 and/or 104 may execute software applications that cause client devices 102 and/or 104 to access an updated version of the hybrid, block-chain ledger data structure associated with the Internet-connected device, and to parse blocks of the access data structure to obtain discrete or aggregated sensor data indicative of the current or prior location, usage, performance, and/or status of the Internet-connected device. Based on the accessed sensor data, users 108 and 110 may monitor their mutual compliance with the agreed-upon usage restrictions on the Internet-connected vehicle.

In other aspects, described below in FIG. 7B, systems associated with the first and second financial institutions (e.g., systems 140 and 143) may execute software instructions to access updated version of the hybrid, block-chain ledger data structure, and to parse blocks of the accessed data structure to obtain discrete or aggregated sensor data indicative of the current or prior location, usage characteristics, performance characteristics, and/or operational status of the connected device. Based on the obtained sensor data, and the encrypted event trigger list and rules engine, systems 140 and 143 may monitor the compliance of user 108 and/or 110 with the imposed restrictions on the location, usage, performance, and/or status of the Internet-connected device. For example, systems 140 and 143 may determine that a violation of the imposed restrictions represents an event triggering a performance of one or more operations by systems 140 and/or 143, such as the provision of a warning alerting the owner of the violation, an imposition of a financial penalty on the violating partial owner, and/or a modification to a term of a financing agreement of the violating partial owner.

Figure 7B:
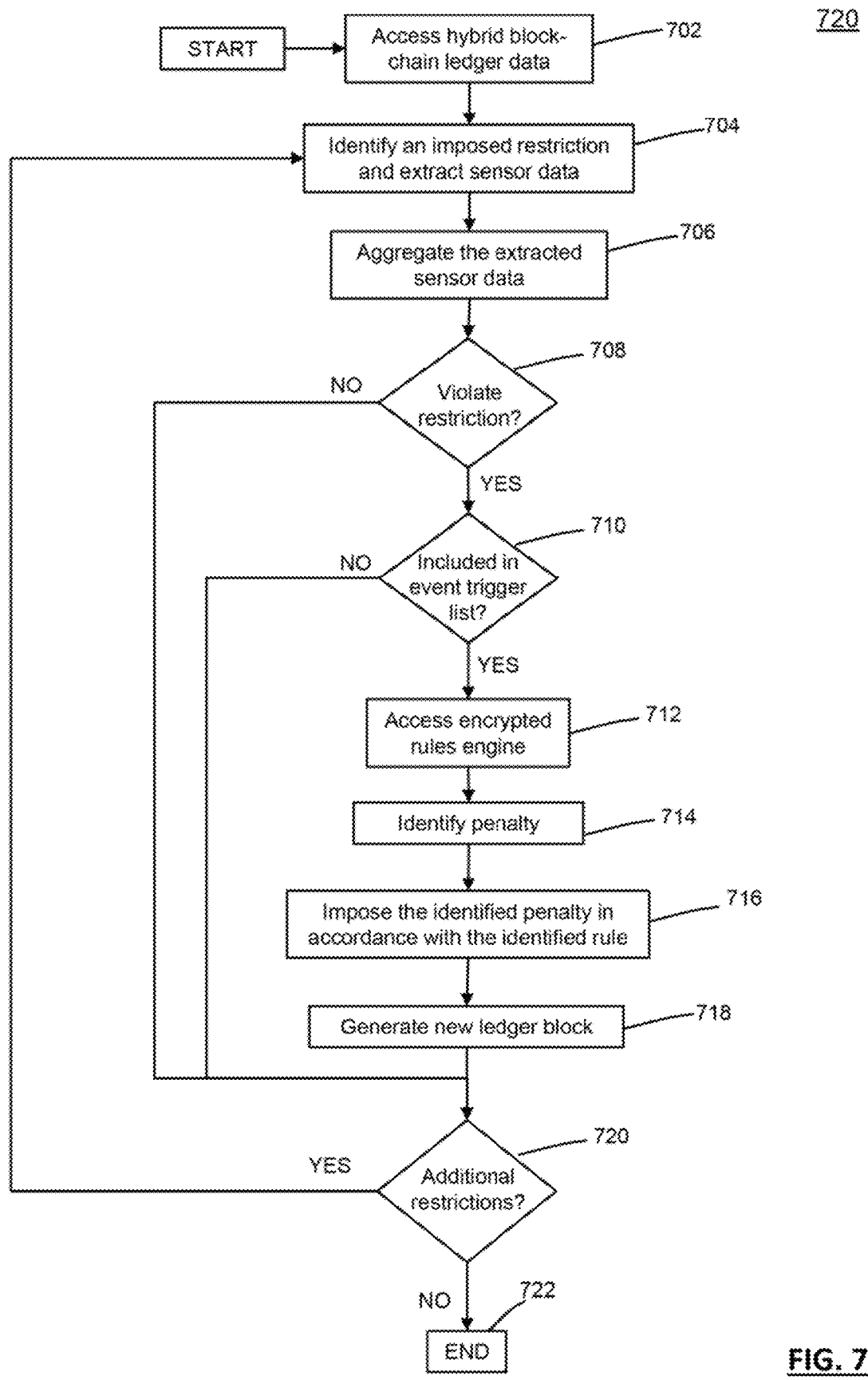

FIG. 7B is a flowchart of an exemplary process 750 for automatically verifying a partial owner's compliance with one or more assets usage restrictions tracked within a hybrid block-chain ledger, in accordance with disclosed embodiments. In an embodiment, a financial institution may provide financing that supports a customer's purchase of a portion of an asset (e.g., a connected vehicle), and as a condition to the financing, the financial institution may establish one or more usage restrictions on the customer's portion of the connected vehicle and one or penalties associated with a violation of the usage restriction. As described above, one or more blocks of a hybrid block-chain ledger data structures may track the partial interests of the customer and the financial institution in the customer's portion of the connected vehicle and further, may track the one or more usage restrictions and the established penalties.

Further, in additional embodiments, blocks of the exemplary hybrid block-chain ledger data structures described above may include sensor data indicative of a location, usage, performance, and/or status of the connected vehicle, which may be collected and aggregated through one or more integrated sensor devices or external sensor devices, as described above. In some aspects, system 140 may execute software instructions to determine, based on the tracked sensor data, whether the customer complies one or more of the imposed usage restrictions and further, to perform operations that impose one or more penalties in response to a determined violation of the usage restrictions.

In certain aspects, system 140 may execute software applications that access data corresponding to one or more stored hybrid block-chain ledgers that track an ownership and usage of a particular asset (e.g., in step 702), and further, that parse discrete blocks of the accessed hybrid block-chain ledger data to identify a usage restriction imposed by the financial institution and occurrences of sensor data within the accessed hybrid block-chain ledger data (e.g., in step 704). By way of example, system 140 may obtain the one or more hybrid block-chain ledgers data from one or more of peer systems 160 (which may generate and update the one or more hybrid block-chain ledgers using any of the exemplary techniques described above), and may store the data corresponding to the obtained hybrid block-chain ledgers in a portion of a locally accessible data repository (e.g., data repository 144) and additionally or alternatively, within a data repository accessible to system 140 across network 120 (e.g., network accessible cloud-based storage).

For example, and using any of the exemplary techniques described above, system 140 may identify, within at least one block of the hybrid block-chain ledger data, data indicative of a restriction imposed on a customer's use of the connected vehicle and a temporal interval associated with the restriction (e.g., the financial institution may limit user 108's operation of the connected vehicle to less than 3,000 miles per month). System 140 may also parse the blocks of the hybrid block-chain ledger data to extract sensor data, and in particular, usage data indicative of a distance driven by the customer over a particular interval, received from one or more integrated sensor devices included within the connected vehicle or from one or more external sensor devices disposed within an environment in which user 108 operates the connected vehicle.

In some aspects, in step 706, system 140 may aggregate the extracted sensor data over the temporal interval established by the usage restriction, and may determine in step 708 whether the aggregated and extracted sensor data indicates a violation of the usage restriction. For example, system 140 may determine the usage restriction limits a monthly mileage due to user 108's operation of the vehicle, and further, that the blocks of the hybrid block-chain ledger data incorporate usage data for the connected vehicle on a weekly basis. System 140 may, by way of example, aggregate the extracted weekly usage data to generate the monthly usage data in step 706. For instance, system 140 may determine that user 108 drove the connected vehicle accrued 4,700 miles during the prior month (e.g., in step 706), which system 140 may determine violates the usage restriction imposed by the financial institution (e.g., in step 708).

If system 140 were to determine that the extracted sensor data indicates a violation of the usage restriction (e.g., step 708; YES), system 140 may access the stored list of triggering events (e.g., within database 144), and in step 710, may determine whether the list of triggering events includes the determined violation of the usage restriction. If system 140 were to identify the violation of the usage restriction within the list of triggering events (e.g., step 710; YES), system 140 may further process the hybrid block-chain ledger data to access and decrypt an encrypted rules engine in step 712 (e.g., using the master encryption key), and further, may identify at least one of the rules specifying an operation to be performed in response to the detected violation of the usage restrictions (e.g., in step 714).

For example, and in response to the detected violation of the usage restriction, system 140 may identify at least one of the rules within the decrypted rules engine that specifies an imposition of one or more financial penalties on customer 108. For example, as set forth in the decrypted rules engine, or alternatively, as set forth in a body of one or more blocks of the hybrid, block-chain ledger data structure, that system 140 should impose a financial penalty of 20¢ on each driven mile in excess of the 3,000-miles monthly limit.

System 140 may, in some aspects, perform operations that impose the identified penalty on user 108 (e.g., in step 716) and that generate an additional block of the hybrid, block-chain ledger data structure to record the imposed penalty (e.g., in step 718). For example, system 140 may determine in step 716 that user 108 exceeded the monthly 3,000-mile limit by 1,700 miles, and thus, may impose a $340 penalty on user 108. In some aspects, system 140 may execute one or more software applications that increment a next scheduled monthly payment (e.g., as set forth in a financing agreement between the first financial institution and user 108) to account for the additional $340 penalty.

Further, in step 718, system 140 may generate transaction data that identifies the user 108's current monthly usage of the connected vehicle, the usage restriction imposed on user 108's portion of the connected device, and further, that identifies the determined financial penalty (e.g., $240) resulting from user 108 violation of the imposed usage restriction. In certain aspects, system 140 may transmit the generated transaction data to peer systems 160 across network 120. Using any of the exemplary techniques described above, peer systems 160 may competitively process the transaction data received from system 140 to generate the new data block of a hybrid, block-chain data structure that record user 108's violation of the usage restriction and the imposed penalty. As described above, one or more of peer systems 160 may distribute the newly updated hybrid, block-chain data structure across peer systems 160 (e.g., through a peer-to-peer network) and to other devices operating environment 100 (e.g., across network 120).

In step 720, system 140 may further parse the hybrid block-chain ledger data to determine whether additional usage restrictions (e.g., location-based restrictions, operation-based restrictions related to proper service, etc.) require validation. If system 140 were to determine that no further additional usage restrictions require analysis (e.g., step 720; NO), exemplary process 750 is then complete in step 722. If, however, system 140 were to identify additional usage restrictions (e.g., step 720; YES), exemplary process 750 may pass back to step 704, and system 140 may determine whether user 108's activities violate additional ones of the usage restriction, as described above.

Further, if system 140 were to determine that the list of triggering events fails to include the determined violation of the usage restrictions (e.g., step 710; NO), exemplary process 700 may pass forward to step 720, and system 140 may determine whether additional usage restrictions require analysis, as described above.

Further, if system 140 were to determine that user 108's activities fail to represents a violation of the identified usage restriction (e.g., step 708; NO), exemplary process 700 may pass forward to step 720, and system 140 may determine whether additional usage restrictions require analysis, as described above.

In the embodiments described above, system 140 may establish and maintain hybrid block-chain ledger architectures that detect and track occurrences of specific events and/or transactions (e.g., customer referrals and resulting customer activity) across the enterprise and further, that distribute various employee rewards based on the detected and racked occurrences. As described above, the disclosed embodiments may perform operations to disburse one or more of these rewards when a corresponding one of the customer referral and/or resulting customer activity represents a triggering event (e.g., and included within an event trigger list maintained in the hybrid block-chain ledgers, as described above).

The disclosed embodiments are, however, not limited to processes that distribute rewards based on a presence of a single triggering event within the hybrid block-chain ledgers maintained by system 140. In additional embodiments, the event trigger lists incorporated into these maintained hybrid block-chain ledgers may specify multiple triggering events that upon detection by system 140, cause system 140 to perform operations to disburse one or more rewards to corresponding employees in accordance with the rules engine, as described above. For example, the multiple trigger events may include, but are not limited to, a certain transaction value, sale, customer interaction, a referral, and/or a combination thereof.

Additionally, in certain disclosed embodiments, system 140 acts as a rules authority for the enterprise (e.g., the financial institution) and further, establishes and maintains one or more the hybrid block-chain data structures and corresponding side chains, as described above. In other embodiments, however, the employee devices that capture referral data and/or realized customer activities may also be configured (e.g., by executed software applications provided by system 140) to provide the captured data to one or more of peer systems 160. Peer systems 160 may, in some aspects, act as "miners" for hybrid block-chain ledgers consistent with the disclosed embodiments. For example, using any of the exemplary techniques outlined above, peer systems 160 may competitively process the received transaction data (either alone or in conjunction with other data) to generate additional ledger blocks, which may be appended to the hybrid block-chain ledgers and/or side chains and distributed across peer systems 160 (e.g., through a peer-to-peer network) and to other connected devices of environment 100 (e.g., across network 120).

Systems and processes consistent with the disclosed embodiments may, in some aspects, integrate all communication channels into a single tracking system, and provides a platform upon which referrals can be monetized. These exemplary systems and processes can further increase the value proposition for each customer going through this interaction. Thus, disclosed embodiments this exhibit advantages over existing systems which leverage conventional block-chain ledgers.

Through the disclosed embodiments, the exemplary hybrid block-chain ledger architectures described above may provide a centralized, and transparent mechanism for subdividing ownership of the Internet-connected vehicle among different partial owners, allocating the rights and responsibilities derivative of that ownership among the partial owners, and further, tracking an evolution of the subdivided ownership and/or the allocated rights and responsibilities throughout a lifecycle of the Internet-connected vehicle. In certain aspects, the data identifying the allocated rights and responsibilities may be accessible to devices associated with the partial owners (e.g., client devices 102 and 104), which may execute one or more software applications to present the allocated rights and responsibilities to corresponding ones of the partial owners in read-only or other restricted format. Further, in additional aspects, one or more data blocks of the hybrid block-chain ledger architectures described above may track the rights and responsibilities allocated to the partial owners of the Internet-connected device (e.g., allocated both by mutual agreement and by corresponding ones of the participating financial institutions), thus allowing participating financial institutions to review the allocated rights and responsibilities to prevent conflicts among these allocated rights and responsibilities.

In the exemplary embodiments described above, systems maintained by each of the participating financial institutions (e.g., systems 140 and 143 of the first and second financial institutions) may act as "nodes" capable of generating data for inclusion within new blocks of a hybrid, block-chain ledger structure associated with a particular asset. These embodiments are, however, not limited to these exemplary nodes and systems, and in further embodiments, a computer system maintained by a governmental or regulatory entity (e.g., system 146) may administer ownership rights to the tracked asset and may be configured to generate "transaction" data facilitating the creation of a new data block of the hybrid, block-chain ledger structure. For example, the partial owners of the Internet-connected vehicle may accrue a number of unpaid citations for illegal parking, and a local governmental entity may obtain a judicial order establishing a lien on the Internet-connected vehicle to facilitate collection of the unpaid citations. In certain aspects, system 146 (i.e., maintained by the local governmental entity) may generate "transaction" data that among other things, identifies the local governmental entity, identifies the Internet-connected vehicle (i.e., a VIN number, a MAC or IP address, etc.), and further, identifies the established lien (e.g., an amount of the lien, dates and identifiers of the unpaid citations, and additionally or alternatively, text of the judicial order establishing the lien).

In the embodiments described above, users 108 and 110 both obtain financing to purchase respective portions of the connected vehicle, data indicative of which systems 140 and 141 provide to peer systems 140 for inclusion in a new ledger block of a hybrid block-chain ledger that tracks the subdivided ownership of the connected vehicle. The disclosed embodiments are, however, not limited to user purchases financed by financial institutions using various debt instruments, and in further embodiments, the exemplary hybrid block-chain ledgers described above may track a subdivided ownership interests of various entities without encumbrance by financial institutions. For example, and as described above, user 110 may elect to provide $22,500 in personal funds to purchase one-half of the connected vehicle, and the new ledger block generated by peer systems 160 may identify user 108's one-half interest in the connected vehicle, as limited by the first financial institution's lien on user 108's interest, and may identify user 110's one-half interest in the connected vehicle without encumbrance (i.e., free and clear).

Further, the disclosed embodiments are not limited to tracked assets that include connected devices operating within environment 10 and capable of exchanging data with other devices and computer systems across network 120. In other embodiments, the exemplary hybrid block-chain ledger data structures described above may generate and track subdivided ownership interests, rights, and obligations held by individuals and entities (e.g., corporate and/or juristic entities) in any additional or alternate asset, including, but not limited to corporate entities, juristic entities, securities, commodities, parcels of real estate, physical objects, and intellectual property.

Further, in certain disclosed embodiments, peer systems 169 represent a public, de-centralized network of "miners" that competitively generate new blocks hybrid block-chain ledgers data structures based on "transaction data" received from various computing systems and devices across network 120 (e.g., systems 140, 141, and/or 145, and devices 102, 104, and/or 106). In other aspects, and consistent with the disclosed embodiments, one or more of systems 140, 141, and/or 145, maintained and acting on behalf of a rules authority (e.g., a financial institution or governmental entity) establish, maintain, and distribute one or more the hybrid block-chain data structures using any of the exemplary processes described above. In some aspects, system 140 (and/or systems 141 and 145) may establish and maintain the exemplary the hybrid block-chain data structures to track a subdivided ownership of devices and systems operating within a closed enterprise (e.g., computing devices assigned to employees within a large business enterprise).

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
    at least one processor; and
    a non-transitory memory storing executable instructions that, when executed by the at least one processor, cause the at least one processor to perform the steps of:
        retrieving a master cryptographic key of a centralized authority from a secure data repository;
        accessing data maintained within an element of a block-chain ledger, and based on the accessed data, determining an occurrence of an event impacting a first ownership interest in an asset, the first ownership being held by at least a first user;
        based on the determination of the occurrence of the event:
            decrypting an encrypted first portion of the accessed data using the master cryptographic key, the decrypted first portion identifying a plurality of rules associated with the centralized authority;
            decrypting an encrypted second portion of the accessed data using a private cryptographic key associated with the first user, the decrypted second portion of the accessed data identifying a plurality of triggering events;
            determining that the event corresponds to at least one of the triggering events; and
            when the event corresponds to at least one of the triggering events, identifying at least one of the plurality of rules that exhibits a relationship with the event; and
        performing operations consistent with the at least one of the plurality of rules, the operations comprising:
            generating event data that associates the event with an updated first ownership interest in the asset, the updated first ownership interest being held by at least a second user, and the event data comprising an additional plurality of triggering events and an additional plurality of rules; and
            generating and transmitting a signal to one or more peer systems, the signal comprising the event data and information that instructs the one or more peer systems to record the event data, including the additional plurality of triggered events and the additional plurality of rules, within an additional block of the block-chain ledger,
        wherein the plurality of triggering events and the additional plurality of triggering events differ, and wherein the plurality of rules and the additional plurality of rules differ.

2. The apparatus of claim 1, wherein the executed instructions further cause the at least one processor to perform the steps of:
    receiving, from the one or more peer systems, an updated block-chain ledger that includes the additional block; and
    storing the updated block-chain ledger within a portion of the, non-transitory memory.

3. The apparatus of claim 1, wherein:
    the private cryptographic key is associated with the event; and
    the additional block further comprises the encrypted first portion of the accessed data, the encrypted second portion of the accessed data, and the event data.

4. The apparatus of claim 3, wherein the executed instructions further cause the at least one processor to perform the steps of:
    generating the master cryptographic key;
    storing the generated master cryptographic key in a portion of the secure data repository; and
    establishing an access permission for the master cryptographic key.

5. The apparatus of claim 1, wherein:
    the first user corresponds to a first partial owner of the asset, and the accessed data tracks the first ownership interest;
    the executed instructions further cause the at least one processor to perform the steps of:
        based on the accessed data, identifying a sale of the first ownership interest to a second partial owner, the sale establishing a second ownership interest of the second partial owner in the asset;

determine that the sale corresponds to the at least one of the triggering events based on the decrypted second portion;

identifying the at least one of the rules that exhibits the relationship with the sale based on the decrypted first portion; and obtaining, from the decrypted first portion, distribution data associated with the at least one rule, the distribution data specifying a distribution of proceeds from the sale to one or more additional parties; and the operations further comprise initiating an electronic transfer of proceeds of the sale from the first partial owner to the one or more additional parties in accordance with the distribution data.

6. The apparatus of claim 5, wherein the event data comprises at least one of confirmation information that confirms the sale of the first ownership interest or ownership information that identifies the second ownership interest.

7. The apparatus of claim 1, wherein:
the asset comprises a device communicatively coupled to the apparatus across a communications network; and
the accessed data comprises an identifier of the device and usage data indicative of at least one of a location, a performance, an operation, or a status of the device during a corresponding time period.

8. The apparatus of claim 7, wherein:
the executed instructions further cause the at least one processor to perform the steps of:
based on the decrypted first portion, determining a usage restriction associated with the device and a penalty associated with a violation of the usage restriction; and
establishing a violation of the usage restriction based on at least a portion of the usage data;
the operations further comprise imposing the penalty on at least one of an operator or an owner of the device in accordance with the at least one rule; and
the event data comprises the device identifier, the portion of the usage data, and penalty information that associates the at least one of the owner or the operator with the violation and the penalty.

9. The apparatus of claim 1, wherein the event data comprises additional information that identifies the impact of the event on the first ownership interest.

10. The apparatus of claim 1, wherein the additional block of the block-chain ledger comprises the event data, the encrypted first portion, and the encrypted second portion.

11. The apparatus of claim 1, wherein the executed instructions further cause the at least one processor to perform the steps of:
modifying the decrypted first portion of the accessed data, the modified first portion comprising a modification to at least one of the plurality of rules;
encrypting the modified first portion using the master cryptographic key; and
generating and transmitting an additional signal to the one or more peer systems, the additional signal comprising the encrypted modified first portion, the encrypted second portion of the accessed data, and additional information that instructs the one or more peer systems to record at least the encrypted modified first portion and the encrypted second portion within a further element of the block-chain ledger.

12. A computer-implemented method, comprising:
retrieving, by at least one processor, a master cryptographic key of a centralized authority from a secure data repository;

accessing, by the at least one processor, data maintained within an element of a block-chain ledger, and based on the accessed data, determining, by the at least one processor, an occurrence of an event impacting a first ownership interest in an asset, the first ownership being held by at least a first user;

based on the determination of the occurrence of the event:
decrypting, by the at least one processor, an encrypted first portion of the accessed data using the master cryptographic key, the decrypted first portion identifying a plurality of rules associated with the centralized authority;
decrypting, by the at least one processor, an encrypted second portion of the accessed data using a private cryptographic key associated with the first user, the decrypted second portion of the accessed data identifying a plurality of triggering events;
determining, by the at least one processor, that the event corresponds to at least one of the triggering events; and
when the event corresponds to at least one of the triggering events, identifying, by the at least one processor, at least one of the plurality of rules that exhibits a relationship with the event; and performing, by the at least one processor, operations consistent with the at least one of the plurality of rules, the operations comprising:
generating event data that associates the event with an updated first ownership interest in the asset, the updated first ownership interest being held by at least a second user, and the event data comprising an additional plurality of triggering events and an additional plurality of rules; and
generating and transmitting a signal to one or more peer systems, the signal comprising the event data and information that instructs the one or more peer systems to record at least the event data, including the additional plurality of triggered events and the additional plurality of rules, within an additional block of the block-chain-ledger,
wherein the plurality of triggering events and the additional plurality of triggering events differ, and wherein the plurality of rules and the additional plurality of rules differ.

13. The computer-implemented method of claim 12, wherein:
the event data comprises additional information that identifies the impact of the event on the first ownership interest; and
the computer-implemented method further comprises:
receiving, from the one or more peer systems, and by the at least one processor, an updated block-chain ledger that includes the additional block; and
storing, by the at least one processor, the updated block-chain ledger within a portion of a, non-transitory memory.

14. The computer-implemented method of claim 12, wherein:
the private cryptographic key is associated with the event; and
the additional block further comprises the encrypted first portion of the accessed data, the encrypted second portion of the accessed data, and the event data.

15. The computer-implemented method of claim 14, further comprising:
generating, by the at least one processor, the master cryptographic key;

storing, by the at least one processor, the generated master cryptographic key in a portion of the secure data repository; and establishing, by the at least one processor, at least one access permission for the master cryptographic key.

16. The computer-implemented method of claim 14, wherein:

the first user corresponds to a first partial owner of the asset, and the accessed data tracks the first ownership interest;

the method further comprises:

based on the accessed data, identifying, by the at least one processor, a sale of the first ownership interest to a second partial owner, the sale establishing a second ownership interest of the second partial owner in the asset;

determining, by the at least one processor, that the sale corresponds to the at least one of the triggering events based on the decrypted second portion;

identifying, by the at least one processor, the at least one of the rules that exhibits the relationship with the sale based on the decrypted first portion; and obtaining, from the decrypted first portion, and by the at least one processor, distribution data associated with the at least one rule, the distribution data specifying a distribution of proceeds from the sale to one or more additional parties; and the operations further comprise initiating an electronic transfer of proceeds of the sale from the first partial owner to the one or more additional parties in accordance with the distribution data.

17. The computer-implemented method of claim 16, wherein the event data comprises at least one of confirmation information that confirms the sale of the first ownership interest from the first partial owner to the second partial owner or ownership information that identifies the second ownership interest held by one second partial owner.

18. The computer-implemented method of claim 12, wherein:

the asset comprises a device communicatively coupled to the at least one processor across a communications network; and the accessed data comprises an identifier of the device and usage data indicative of at least one of a location, a performance, an operation, or a status of the device during a corresponding time period.

19. The computer-implemented method of claim 18, wherein:

the method further comprises:

based on the decrypted first portion, determining, by the at least one processor, a usage restriction associated with the device and at least one penalty associated with a violation of the usage restriction; and establishing, by the at least one processor, a violation of the usage restriction based on at least a portion of the usage data;

the operations further comprise imposing the at least one penalty on at least one of an operation or owner of the device in accordance with the at least one rule; and the event data comprises the device identifier, the portion of the usage data, and penalty information that associates the at least one of the owner or the operator with the violation and the penalty.

20. A tangible, non-transitory computer-readable medium storing instructions that, when executed by at least one processor, perform a method comprising:

retrieving a master cryptographic key of a centralized authority from a secure data repository;

accessing data maintained within an element of a block-chain ledger, and based on the accessed data, determining, by the at least one processor, an occurrence of an event impacting a first ownership interest in an asset, the first ownership being held by at least a first user;

based on the determination of the occurrence of the event:

decrypting an encrypted first portion of the accessed data using the master cryptographic key, the decrypted first portion identifying a plurality of rules associated with the centralized authority;

decrypting an encrypted second portion of the accessed data using a private cryptographic key associated with the first user, the decrypted second portion of the accessed data identifying a plurality of triggering events;

determining that the event corresponds to at least one of the triggering events; and when the event corresponds to at least one of the triggering events, identifying at least one of the plurality of rules that exhibits a relationship with the event; and performing operations consistent with the at least one of the plurality of rules, the operations comprising:

generating event data that associates the event with an updated first ownership interest in the asset, the updated first ownership interest being held by at least a second user, and the event data comprising an additional plurality of triggering events and an additional plurality of rules; and generating and transmitting a signal to one or more peer systems, the signal comprising the event data and information that instructs the one or more peer systems to record at least the event data, including the additional plurality of triggered events and the additional plurality of rules, within an additional block of the block-chain ledger, wherein the plurality of triggering events and the additional plurality of triggering events differ, and wherein the plurality of rules and the additional plurality of rules differ.

* * * * *